United States Patent
Ishii et al.

(10) Patent No.: US 8,264,740 B2
(45) Date of Patent: *Sep. 11, 2012

(54) IMAGE PRINTING APPARATUS AND METHOD OF CONTROLLING THE SAME

(75) Inventors: Hirokazu Ishii, Yokohama (JP); Shigeki Hachiro, Yokohama (JP); Kazuya Imafuku, Kawasaki (JP); Naomi Nakamura, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/070,817

(22) Filed: Mar. 24, 2011

(65) Prior Publication Data

US 2011/0170121 A1    Jul. 14, 2011

Related U.S. Application Data

(63) Continuation of application No. 11/501,023, filed on Aug. 9, 2006, now Pat. No. 7,929,175.

(30) Foreign Application Priority Data

Aug. 10, 2005   (JP) ................................. 2005-232301

(51) Int. Cl.
*G06K 15/02* (2006.01)
*G06K 15/00* (2006.01)
*H04N 1/00* (2006.01)
*H04N 1/46* (2006.01)
*G06F 3/12* (2006.01)

(52) U.S. Cl. ........ 358/1.2; 358/1.16; 358/1.13; 358/1.9; 358/528

(58) Field of Classification Search ..................... None
See application file for complete search history.

(56) References Cited

U.S. PATENT DOCUMENTS

| | | | | |
|---|---|---|---|---|
| 4,872,064 | A | * | 10/1989 | Tutt et al. .................... 382/298 |
| 5,161,035 | A | * | 11/1992 | Muramatsu .................. 358/451 |
| 5,553,201 | A | * | 9/1996 | Muramatsu .................. 358/1.9 |
| 5,764,370 | A | * | 6/1998 | Amakawa et al. ............ 382/298 |
| 6,449,056 | B1 | * | 9/2002 | Mishima et al. ............. 358/1.16 |
| 6,768,559 | B1 | * | 7/2004 | Kuwata et al. ................ 358/1.9 |
| 7,117,023 | B2 | * | 10/2006 | Takeda et al. ................. 455/574 |
| 7,209,260 | B1 | * | 4/2007 | Tanaka et al. ................. 358/1.2 |

(Continued)

FOREIGN PATENT DOCUMENTS

JP          64-58162 A       3/1989

(Continued)

*Primary Examiner* — Hilina S Kassa
(74) *Attorney, Agent, or Firm* — Fitzpatrick, Cella, Harper & Scinto

(57) ABSTRACT

This invention relates an image printing apparatus capable of copying by executing enlargement/reduction (E/R) processing optimum to an instructed mode. According to the apparatus, a copy mode and an enlargement rate are input. The use priority order of each enlargement/reduction (E/R) unit of the apparatus is decided. The enlargement rate is distributed to each E/R unit in accordance with the copy mode, decided use priority order, and the E/R rate upper limit value of each E/R unit. An image is copied by causing each E/R unit to sequentially execute E/R processing in accordance with the distributed enlargement rate and the decided use priority order and causing a printing unit to print based on the image data that has undergone the E/R processing.

6 Claims, 21 Drawing Sheets

U.S. PATENT DOCUMENTS

| | | | |
|---|---|---|---|
| 7,224,482 B2 * | 5/2007 | Shima | 358/1.18 |
| 7,388,692 B2 * | 6/2008 | Mimamino et al. | 358/483 |
| 7,408,672 B2 * | 8/2008 | Ito | 358/1.2 |
| 7,471,412 B2 | 12/2008 | Hachiro et al. | |
| 7,532,350 B2 * | 5/2009 | Takahashi et al. | 358/1.16 |
| 7,542,173 B2 * | 6/2009 | Suzuki | 358/3.27 |
| 7,595,898 B2 * | 9/2009 | Murakami | 358/1.12 |
| 7,710,619 B2 * | 5/2010 | Kawano et al. | 358/518 |
| 2007/0035760 A1 | 2/2007 | Hachiro et al. | |

FOREIGN PATENT DOCUMENTS

| | | |
|---|---|---|
| JP | 5-122506 A | 5/1993 |
| JP | 7-212568 A | 8/1995 |
| JP | 2000-32256 A | 1/2000 |
| JP | 2002-281295 A | 9/2002 |
| JP | 2005-124141 A | 5/2005 |

* cited by examiner

FIG. 5

| | ENLARGEMENT / REDUCTION RATE SETTING PRIORITY | | ENLARGEMENT / REDUCTION RATE UPPER LIMIT |
|---|---|---|---|
| | IMAGE QUALITY-ORIENTED MODE | SPEED-ORIENTED MODE | |
| FIRST ENLARGEMENT / REDUCTION PROCESSING UNIT | 1 | 2 | 400% |
| SECOND ENLARGEMENT / REDUCTION PROCESSING UNIT | 3 | 3 | 800% |
| THIRD ENLARGEMENT / REDUCTION PROCESSING UNIT | 2 | 1 | 800% |

READ ORIGINAL

AREA TO BE CUT OFF UPON PRINTING

IMAGE OBTAINED BY ENLARGING READ ORIGINAL BY SEVERAL %

IMAGE OBTAINED BY EXECUTING MARGINLESS COPY ON PRINTING PAPER SHEET

FIG. 14

| | MARGINED | | | MARGINLESS | |
|---|---|---|---|---|---|
| | ENLARGEMENT / REDUCTION RATE SETTING PRIORITY | | ENLARGEMENT / REDUCTION RATE UPPER LIMIT | ENLARGEMENT / REDUCTION RATE SETTING PRIORITY | ENLARGEMENT / REDUCTION RATE UPPER LIMIT |
| | IMAGE QUALITY-ORIENTED MODE | SPEED-ORIENTED MODE | | | |
| FIRST ENLARGEMENT / REDUCTION PROCESSING UNIT | 1 | 2 | 400% | 2 | 400% |
| SECOND ENLARGEMENT / REDUCTION PROCESSING UNIT | 3 | 3 | 800% | 3 | 800% |
| THIRD ENLARGEMENT / REDUCTION PROCESSING UNIT | 2 | 1 | 800% | 1 | 110% |

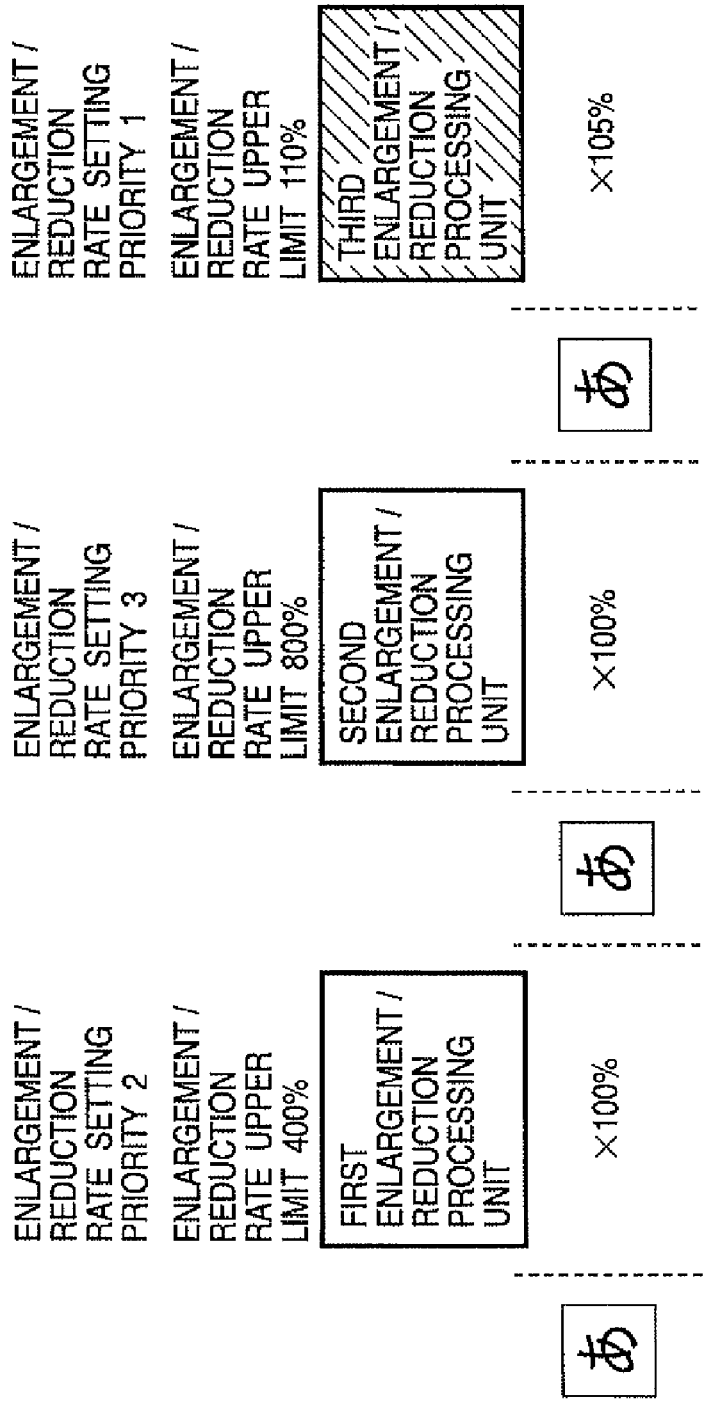

F I G. 19

|  | ENLARGEMENT / REDUCTION RATE SETTING PRIORITY | ENLARGEMENT / REDUCTION RATE UPPER LIMIT | |
|---|---|---|---|
|  |  | NORMAL COPY | MEMORY COPY |
| FIRST ENLARGEMENT / REDUCTION PROCESSING UNIT | 1 | 400% | 400% |
| SECOND ENLARGEMENT / REDUCTION PROCESSING UNIT | 3 | 800% | 800% |
| THIRD ENLARGEMENT / REDUCTION PROCESSING UNIT | 2 | 800% | 200% |

IMAGE PRINTING APPARATUS AND METHOD OF CONTROLLING THE SAME

This application is a continuation of U.S. patent application Ser. No. 11/501,023, filed Aug. 9, 2006 (allowed), the contents of which are incorporated by reference herein.

BACKGROUND OF THE INVENTION

1. Field of the Invention

This invention relates to an image printing apparatus and a method of controlling the same. More particularly, this invention relates to an image printing apparatus which reads an image original and prints it by using a printhead of inkjet printing method and a control method applied to this apparatus.

2. Description of the Related Art

A so-called multi-function printer (MFP) having an image reading function in addition to a print function is recently widespread, replacing a so-called single-function printer (SFP) having only a print function.

In addition to the single-function printer's "print function" of printing print data generated by a host apparatus such as a personal computer, the multi-function printer has the following functions: a "direct print function" of printing image data stored in, e.g., a memory card without intervening a host apparatus such as a personal computer, an "image supply (scan) function" of supplying image data generated from a read original to, e.g., a personal computer, and a "copy function" of copying a read image without intervening a host apparatus such as a personal computer.

Of these functions, the copy function is unique to the multi-function printer since the function cannot be implemented by a single function apparatus such as a single-function printer or scanner. The copy function includes various copy modes to meet the needs of users.

The copy modes include, e.g., a "same-size copy" mode to copy an original of the same size (magnification rate: 100%) to a printing paper sheet and a "fixed rate magnification/reduction" mode to copy an original with a specific size (e.g., A4 original) to printing paper sheet of a specific size (e.g., B5 paper). There is also a "marginless copy" mode to copy an original on a printing paper sheet without margins.

A multi-function printer having a film reading function also has a "film copy" mode to copy an image read from a transparent original such as a film on a printing paper sheet.

To cope with these various copy modes, the multi-function printer must have an enlargement/reduction function of changing the enlargement/reduction rate to an arbitrary value. Enlargement/reduction processing is executed normally by using a plurality of enlargement/reduction processing units. To control such a plurality of enlargement/reduction processing units, a method disclosed in, e.g., Japanese Patent Publication Laid-Open No. 5-122506 has been proposed.

According to the method proposed in Japanese Patent Publication Laid-Open No. 5-122506, in a system having an enlargement/reduction processing unit on each of the copy original transmitting side and receiving side, if enlargement processing is necessary, the receiving side executes the processing, and if reduction processing is necessary, the transmitting side executes the processing. With this arrangement, the data transfer amount between the transmitting side and the receiving side is reduced, thereby shortening the transfer time and total processing time.

In the above-described prior art, however, if the enlargement/reduction processing units on the transmitting and receiving sides have different processing capabilities, the processing speed lowers under certain processing conditions. Additionally, if different image qualities are obtained by the enlargement/reduction processing units on the transmitting and receiving sides, an obtained copy image may have poor quality under certain processing conditions.

When processible enlargement/reduction rates are determined in the enlargement/reduction processing units on the transmitting and receiving sides, the enlargement/reduction processing itself may be impossible under certain processing conditions.

SUMMARY OF THE INVENTION

Accordingly, the present invention is conceived as a response to the above-described disadvantages of the conventional art.

For example, an image printing apparatus and a method of controlling the apparatus according to the present invention is capable of copying with magnification/reduction processing most suitable to an input mode.

According to one aspect of the present invention, preferably, there is provided an image printing apparatus which includes reading means for reading an image original and printing means for printing on a print medium on the basis of image data of an image read by said reading means and is capable of copying the image, comprising: instruction input means for instructing a copy mode and an enlargement rate; a plurality of enlargement/reduction means having different performances to enlarge/reduce the image data; decision means for deciding a use priority order of each of the plurality of enlargement/reduction means in accordance with the copy mode instructed by the instruction input means; distribution means for distributing the enlargement rate instructed by the instruction input means to each of the plurality of enlargement/reduction means in accordance with the copy mode instructed by the instruction input means, the use priority order decided by the decision means, and an enlargement/reduction rate upper limit value of each of the plurality of enlargement/reduction means; and copy control means for controlling to copy the image by causing the plurality of enlargement/reduction means to sequentially execute enlargement/reduction processing in accordance with the enlargement rate distributed by the distribution means and the use priority order decided by the decision means and causing the printing means to print on the basis of the image data that has undergone the enlargement/reduction processing.

The apparatus preferably further comprises enlargement/reduction control means for controlling to skip enlargement/reduction processing by all of the plurality of enlargement/reduction means if the enlargement rate instructed by the instruction input means is 100%.

The copy mode includes image quality-oriented copy, speed-oriented copy, marginless copy, and memory copy.

Since the copy mode includes various modes, the distribution means can variously distribute the enlargement rate.

(1) When the copy mode is image quality-oriented copy, the instructed enlargement rate is distributed so that, of the plurality of enlargement/reduction means, enlargement/reduction means with high image quality performance is preferentially used.

(2) When the copy mode is speed-oriented copy, the instructed enlargement rate is distributed so that, of the plurality of enlargement/reduction means, enlargement/reduction means with high processing speed performance is preferentially used.

In a case where the enlargement rate exceeds the enlargement/reduction rate upper limit value of the enlargement/ reduction means assigned to preferential use, and enlargement at the enlargement rate cannot be achieved by enlargement/reduction processing by the enlargement/reduction means, the distribution means distributes a remaining enlargement rate to enlargement/reduction means with lower priority.

(3) When the copy mode is marginless copy, the instructed enlargement rate is distributed so that, of the plurality of enlargement/reduction means, enlargement/reduction means with high processing speed performance is preferentially used. Note that an enlargement/reduction rate upper limit value having a relatively small value is set in the enlargement/reduction means preferentially used in the marginless copy.

In a case where the enlargement rate exceeds the enlargement/reduction rate upper limit value of the enlargement/reduction means assigned to preferential use, and enlargement at the enlargement rate cannot be achieved by enlargement/reduction processing by the enlargement/reduction means, the distribution means distributes a remaining enlargement rate to enlargement/reduction means with higher image quality performance.

The apparatus preferably further comprises storage means for storing the image data of the image read by the reading means, encoding means for encoding and compressing the image data before storage in the storage means, and decoding means for reading out and decompressing the compressed image data stored in the storage means.

With this arrangement, the distribution means can distribute the enlargement rate in the following.

If the copy mode is memory copy, the instructed enlargement rate is distributed so that, of the plurality of enlargement/reduction means, enlargement/reduction means with high image quality performance is preferentially used.

The encoding means encodes the image data that has undergone enlargement/reduction processing by the enlargement/reduction means assigned to preferential use. In a case where the enlargement rate exceeds the enlargement/reduction rate upper limit value of the enlargement/reduction means assigned to preferential use, and enlargement at the enlargement rate cannot be achieved by enlargement/reduction processing by the enlargement/reduction means, preferably, the distribution means distributes a remaining enlargement rate to enlargement/reduction means with lower priority, and the assigned enlargement/reduction means enlarges/reduces the image data decoded by the decoding means.

The printing means preferably prints on the print medium by an inkjet printhead.

According to another aspect of the present invention, preferably, there is provided a method of controlling an image printing apparatus which includes reading means for reading an image original, printing means for printing on a print medium on the basis of image data of an image read by the reading means, and a plurality of enlargement/reduction means having different performances to enlarge/reduce the image data, and is capable of copying the image, comprising steps of: instructing a copy mode and an enlargement rate; deciding a use priority order of each of the plurality of enlargement/reduction means in accordance with the instructed copy mode; distributing the instructed enlargement rate to the plurality of enlargement/reduction means in accordance with the instructed copy mode, the use priority order decided at the step of deciding, and an enlargement/reduction rate upper limit value of each of the plurality of enlargement/reduction means; and controlling to copy the image by causing the plurality of enlargement/reduction means to sequentially execute enlargement/reduction processing in accordance with the enlargement rate distributed at the step of distributing and the use priority order decided at the step of deciding, and causing the printing means to print on the basis of the image data that has undergone the enlargement/reduction processing.

The invention is particularly advantageous since the use priority order of each of the plurality of enlargement/reduction means is decided in accordance with the instructed copy mode. In addition, the instructed enlargement rate is distributed to the plurality of enlargement/reduction means in accordance with the copy mode, decided use priority order, and enlargement/reduction rate upper limit value. Hence, enlargement/reduction processing optimum to the instructed copy mode and enlargement rate can be executed.

For example, in image quality-oriented copy, enlargement/reduction processing with priority on the image quality can be executed. In speed-oriented copy, enlargement/reduction processing with priority on the processing speed can be executed.

Since an enlargement rate lower than the enlargement/reduction rate upper limit is set in each of the plurality of enlargement/reduction means, unavailable setting of an enlargement rate can be prevented.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a table showing an example of enlargement/reduction processing unit information set in an enlargement/reduction processing unit information database D106;

FIG. 14 is a table showing an example of enlargement/reduction processing unit information set in the enlargement/reduction processing unit information database D106;

FIG. 15 is a view showing a state where 105% enlargement copy is executed in the marginless copy mode in accordance with an enlargement/reduction rate set in each enlargement/reduction processing unit;

FIG. 19 is a table showing an example of enlargement/reduction processing unit information set in the enlargement/reduction processing unit information database D106;

DESCRIPTION OF THE EMBODIMENTS

Preferred embodiments of the present invention will now be described in detail in accordance with the accompanying drawings.

Constituent elements described in the following embodiments are merely illustrative, and the scope of the invention is not limited to them.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink (e.g., can solidify or insolubilize a coloring agent contained in ink applied to the print medium).

Furthermore, unless otherwise stated, the term "nozzle" generally means a set of a discharge orifice, a liquid channel connected to the orifice and an element to generate energy utilized for ink discharge.

<Description of Image Printing Apparatus (FIGS. 1 and 2)>

Figure 1A:
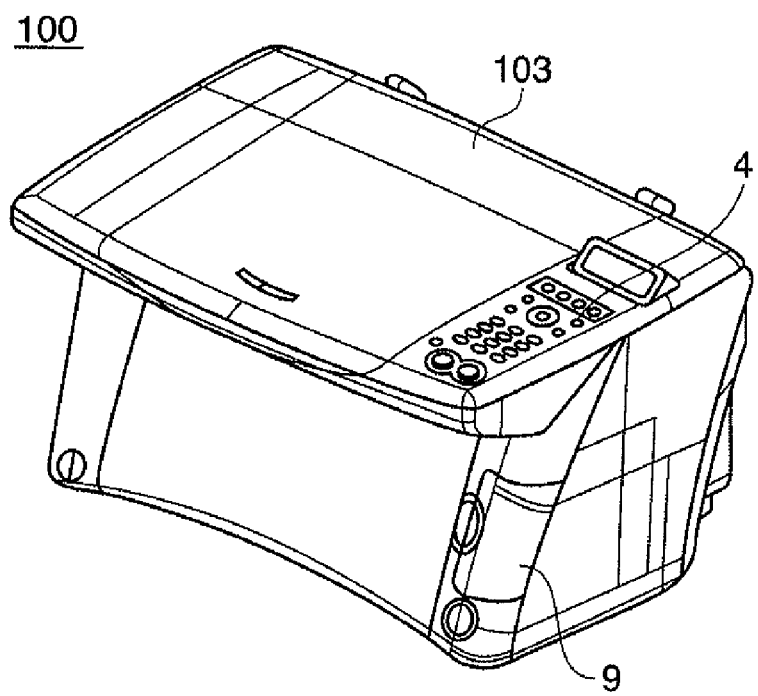
FIGS. 1A and 1B are perspective views showing the outer appearance of an image printing apparatus 100 according to a typical embodiment of the present invention.
Figure 1B:
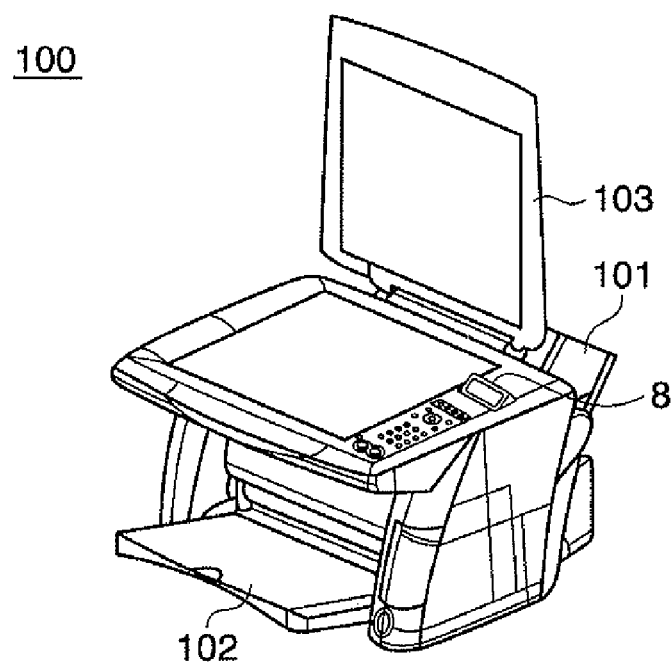

FIGS. 1A and 1B are perspective views showing the outer appearance of an image printing apparatus 100 according to a typical embodiment of the present invention.

The image printing apparatus can print an image on a print medium such as a printing paper sheet on the basis of image data from a connected host (not shown) and also execute printing based on image data stored in, e.g., a memory card and copy by reading an image original.

FIG. 1A shows a state where an original cover 103 is closed. FIG. 1B shows a state where a printing paper tray 101, original cover 103, and the original cover 103 are open.

A reading unit 8 having a CCD sensor reads an image original and outputs red (R), green (G), and blue (B) analog luminance signals. The reading unit 8 may use a contact image sensor (CIS) instead of the CCD. A card interface 9 is used to receive, e.g., a memory card in which image files obtained by a digital still camera (not shown) are stored and read out image data from the memory card in accordance with a predetermined operation of an operation unit 4.

Figure 2:
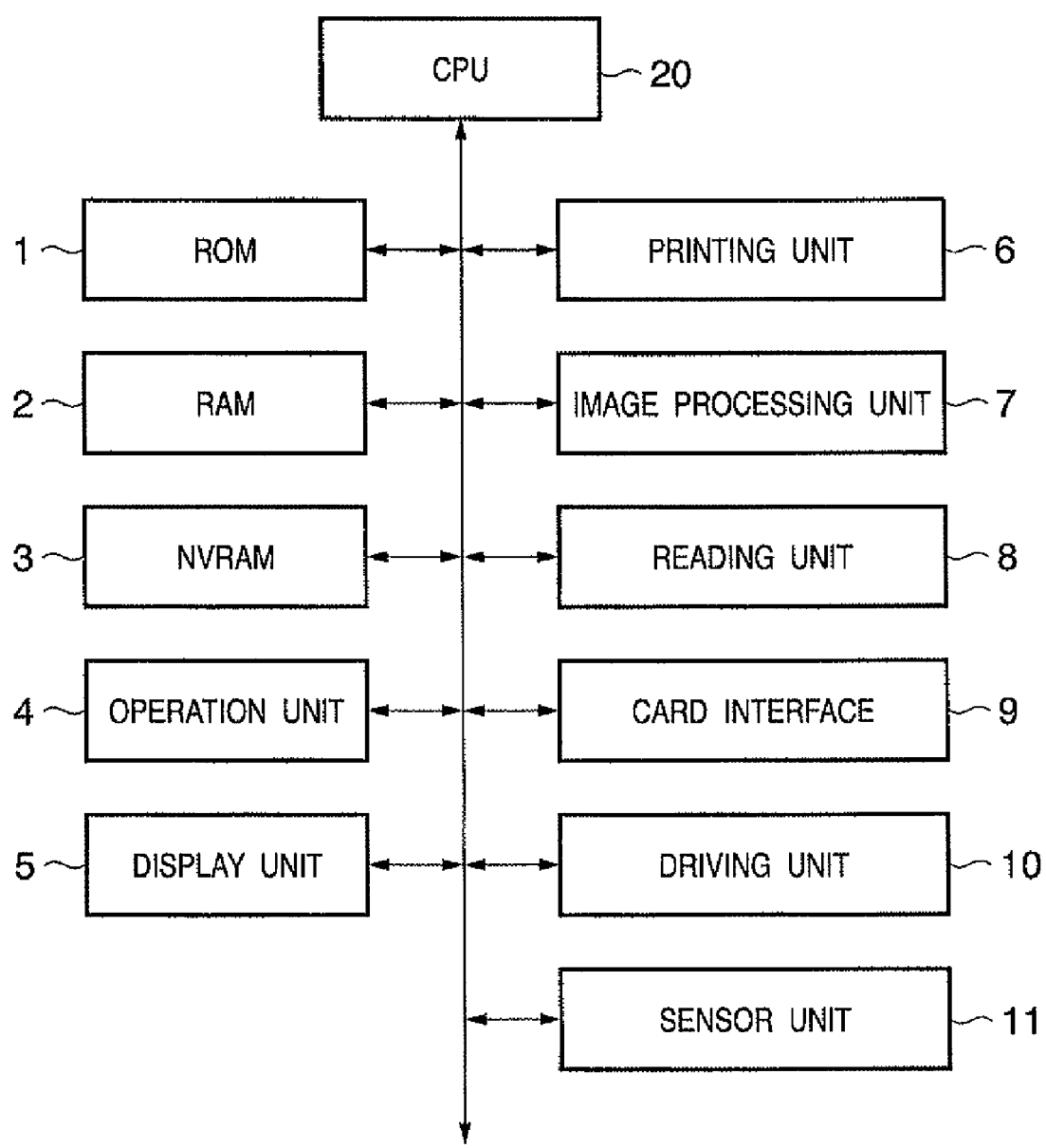
FIG. 2 is a block diagram showing the control configuration of the image printing apparatus 100.

FIG. 2 is a block diagram showing the control configuration of the image printing apparatus 100.

The image printing apparatus 100 comprises a ROM 1, RAM 2, nonvolatile RAM (NVRAM) 3, operation unit 4, display unit 5, printing unit 6, image processing unit 7, reading unit 8, card interface 9, driving unit 10, sensor unit 11, and CPU 20.

The CPU 20 controls various functions of the image printing apparatus 100 and executes various programs stored in the ROM 1 in accordance with a predetermined operation of the operation unit 4. The ROM 1 stores control programs and image processing programs to be executed by the CPU 20.

The image processing unit 7 executes image processing such as color space conversion, enlargement/reduction processing, and quantization. Image data obtained by these image processings is stored in the RAM 2. When image data stored in the RAM 2 reaches a predetermined amount necessary for printing by the printing unit 6, a print operation by the printing unit 6 is executed.

In the above-described image processing, different image data are generated in accordance with settings such as the printing paper sheet size, printing paper sheet type, ON/OFF of magnification/reduction printing, and ON/OFF of marginless printing.

The NVRAM 3 is an SRAM with battery backup or FeRAM, and stores data unique to the image printing apparatus 100. To select image data stored in the memory and start printing, the operation unit 4 comprises a photo-direct print start key, a monochrome/color copy start key, mode keys to set a copy resolution and an image quality, a stop key to stop, e.g., the copy operation, a ten-key pad to input the number of copies, and a registration key. The CPU 20 detects the press statuses of these keys and controls the units in accordance with the press statuses.

The display unit 5 comprises a dot-matrix LCD and an LCD driver and executes various kinds of display under the control of the CPU 20. The printing unit 6 includes an inkjet printhead and a general-purpose IC. The printing unit 6 reads out image data from the RAM 2 and prints the image under the control of the CPU 20.

The driving unit 10 includes a stepping motor and a DC motor to drive feed and discharge rollers, gears to transmit the driving force of the stepping motor and DC motor, and driver circuits to control the stepping motor and DC motor in the operations of the reading unit 8 and printing unit 6.

The sensor unit 11 includes a printing paper width sensor, printing paper presence/absence sensor, original width sensor, original presence/absence sensor, and print medium detection sensor. The CPU 20 detects the statuses of an original and printing paper sheet on the basis of information obtained from these sensors.

Figure 3:
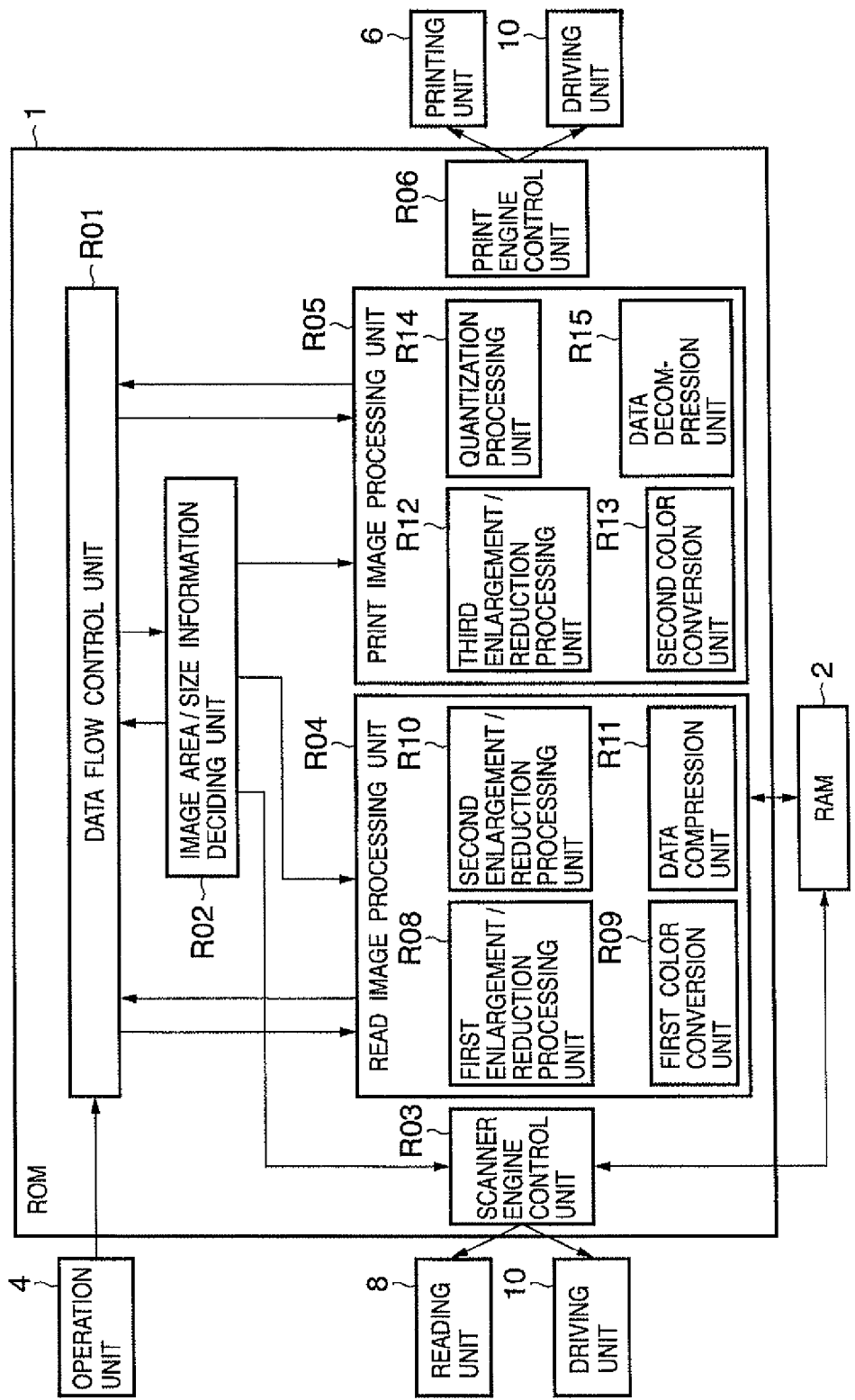
FIG. 3 is a block diagram showing the configuration of programs stored in a ROM 1.

FIG. 3 is a block diagram showing the configuration of programs stored in the ROM 1.

The programs stored in the ROM 1 are divided into a data flow control unit R01, image area/size information deciding unit R02, scanner engine control unit R03, read image processing unit R04, print image processing unit R05, and print engine control unit R06.

The read image processing unit R04 is divided into a first magnification/reduction processing unit R08, first color conversion unit R09, second magnification/reduction processing unit R10, and data compression unit R11. The print image processing unit R05 is divided into a third magnification/reduction processing unit R12, second color conversion unit R13, quantization processing unit R14, and data decompression unit R15.

The data flow control unit R01 decides data processing to be executed and the flow of data on the basis of mode information obtained by receiving a user instruction through the operation unit 4. The image area/size information deciding unit R02 decides the reading range and print range of an image original on the basis of mode information and the like received from the data flow control unit R01. The scanner engine control unit R03 reads image data with a range and size decided by the image area/size information deciding unit R02 by controlling the driving unit 10 and reading unit 8 and then transfers the image data to the read image processing unit R04 through the RAM 2. All the programs are loaded from the ROM 1 to the RAM 2 and executed. Hence, no information input/output is done between the ROM 1 and the RAM 2.

The read image processing unit R04 executes image processing such as magnification/reduction and color conversion in accordance with the set mode, compresses the image data as needed, and saves the compressed data in the RAM 2.

The print image processing unit R05 decompresses image data received through the RAM 2 as needed, executes image processing such as magnification/reduction, color conversion, and quantization necessary for printing, and stores the processing result in the RAM 2.

The print engine control unit R06 controls the printing unit 6 and driving unit 10 to print an image represented by image data stored in the RAM 2 in, e.g., an area on a print medium such as a printing paper sheet decided by the image area/size information deciding unit R02.

The first, second, and third magnification/reduction processing units R08, R10, and R12 set parameters such as a magnification/reduction ratio and enlarge or reduce image data. The first and second color conversion units R09 and R13 set color processing parameters and execute color conversion processing by matrix operation and lookup table reference. The data compression unit R11 compresses image data by JPEG scheme. The data decompression unit R15 decompresses the image data compress-encoded by JPEG scheme. The quantization processing unit R14 quantizes image data into binary data by, e.g., error diffusion.

The image processing units R08 to R15 included in the read image processing unit R04 and print image processing unit R05 may only set image processing parameters and control the image processing unit 7. Actual image processing may be executed by the image processing unit 7 integrating hardware.

Various image original copy processing modes using the image printing apparatus having the above-described configuration will be described next with reference to flowcharts. As is apparent from the above-described configuration, in the apparatus of this embodiment, three processing units, i.e., the first to third enlargement/reduction processing units are responsible for enlargement/reduction processing.

In this embodiment, the first enlargement/reduction processing unit R08 executes enlargement/reduction processing by optically controlling a resolution for the sensor array direction (main scanning direction) of the CCD sensor provided in the reading unit 8, and controlling the driving resolution of the driving unit 10 for the moving direction (sub-scanning direction) of the CCD sensor. Although a high image quality can be obtained for this reason, the processing speed is low due to mechanical control of the driving unit 10. On the other hand, the second enlargement/reduction processing unit R10 and third enlargement/reduction processing unit R12 execute enlargement/reduction processing by executing interpolation based on nearest-neighbor method or bilinear method in the image processing unit 7 integrating hardware. Although the image quality is poorer than in the first enlargement/reduction processing unit R08 which optically executes enlargement/reduction processing, the processing speed is faster than in the first enlargement/reduction processing unit R08 because no mechanical control is necessary. An enlargement/reduction rate is distributed to these enlargement/reduction processing units in accordance with processing conditions depending on various copy processing modes to be described below.

Figure 4:
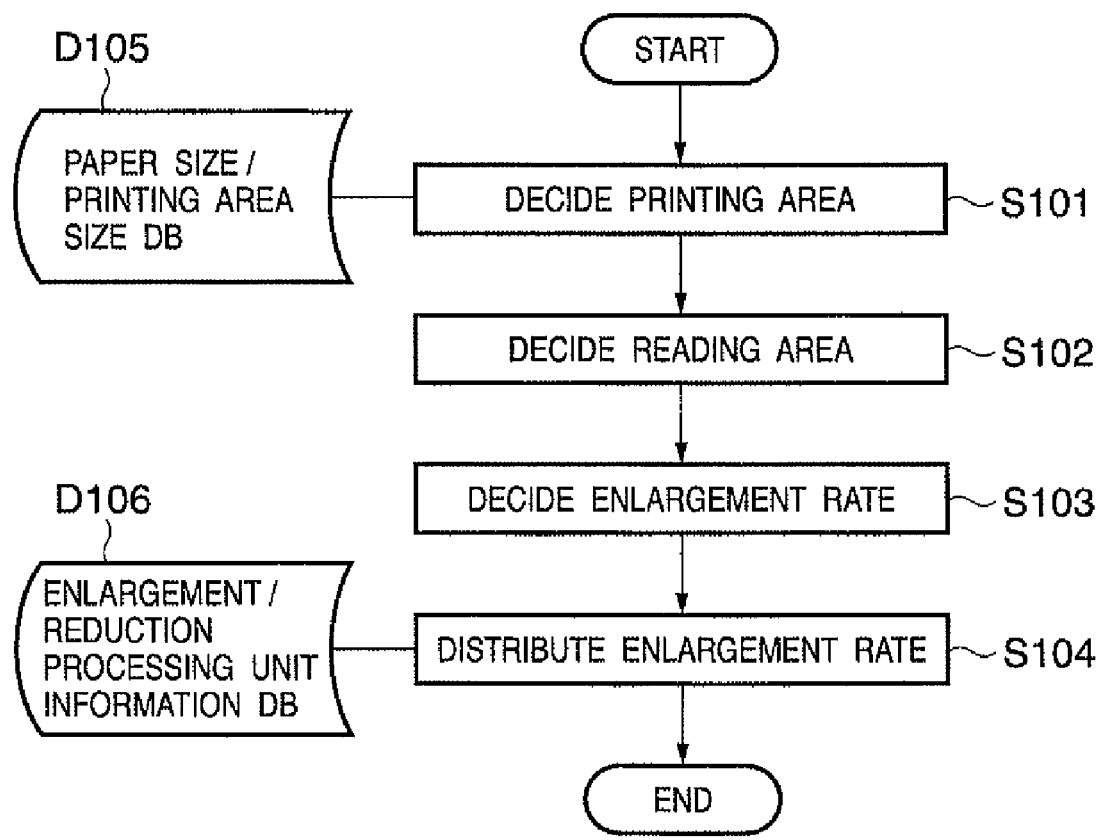
FIG. 4 is a flowchart showing details of processing in an image area/size information deciding unit R02.

1. Enlargement/Reduction Rate Distribution Processing in Image Quality-Oriented Copy and Speed-Oriented Copy FIG. 4 is a flowchart showing internal processing of the image area/size information deciding unit R02.

In step S101, the sizes of a printing paper sheet and printing area are acquired from a printing paper size/printing area size database (DB) D105.

More specifically, the user inputs, through the operation unit 4, instructions representing an A4 printing paper size, desired enlargement rate, and image quality-oriented copy mode or speed-oriented copy mode. The data flow control unit R01 receives the instruction information from the user, analyzes the information, and notifies the image area/size information deciding unit R02 of the operation mode and the A4 printing paper size.

The image area/size information deciding unit R02 acquires the vertical and horizontal pixel counts of the printing paper sheet and the vertical and horizontal pixel counts of the printing area, which are designated from the printing paper size/printing area size DB, and decides the printing area. For example, if the printing resolution is 600 dpi, and the printing paper sheet is A4, the vertical pixel count is 7,015 pixels, and the horizontal pixel count is 4,960 pixels.

In step S102, the image original reading area is decided on the basis of the mode information, and the information of the printing paper sheet and printing area.

In step S103, the enlargement rate of the image original is decided on the basis of the operation mode information, the relationship between the reading area and the printing area, and the enlargement rate designated by the user.

In step S104, enlargement/reduction rates to be set for the respective enlargement/reduction processing units are decided on the basis of the enlargement rate obtained in step S103 and information about each enlargement/reduction processing unit which has been registered in an enlargement/reduction processing unit information database (DB) D106. The decided enlargement/reduction rates are distributed to the enlargement/reduction processing units. Details of this processing will be described below with reference to a table and flowcharts.

FIG. 5 is a table showing an example of enlargement/reduction processing unit information set in the enlargement/reduction processing unit information database D106.

Referring to FIG. 5, in the image quality-oriented mode, an enlargement/reduction rate is distributed to the first enlargement/reduction processing unit R08, third enlargement/reduction processing unit R12, and second enlargement/reduction processing unit R10 preferentially in this order. An enlargement/reduction processing unit with a high priority is preferentially used. In the speed-oriented mode, an enlargement/reduction rate is distributed to the third enlargement/reduction processing unit R12, first enlargement/reduction processing unit R08, and second enlargement/reduction processing unit R10 preferentially in this order. An enlargement/reduction processing unit with a high priority is preferentially used.

Figure 6:
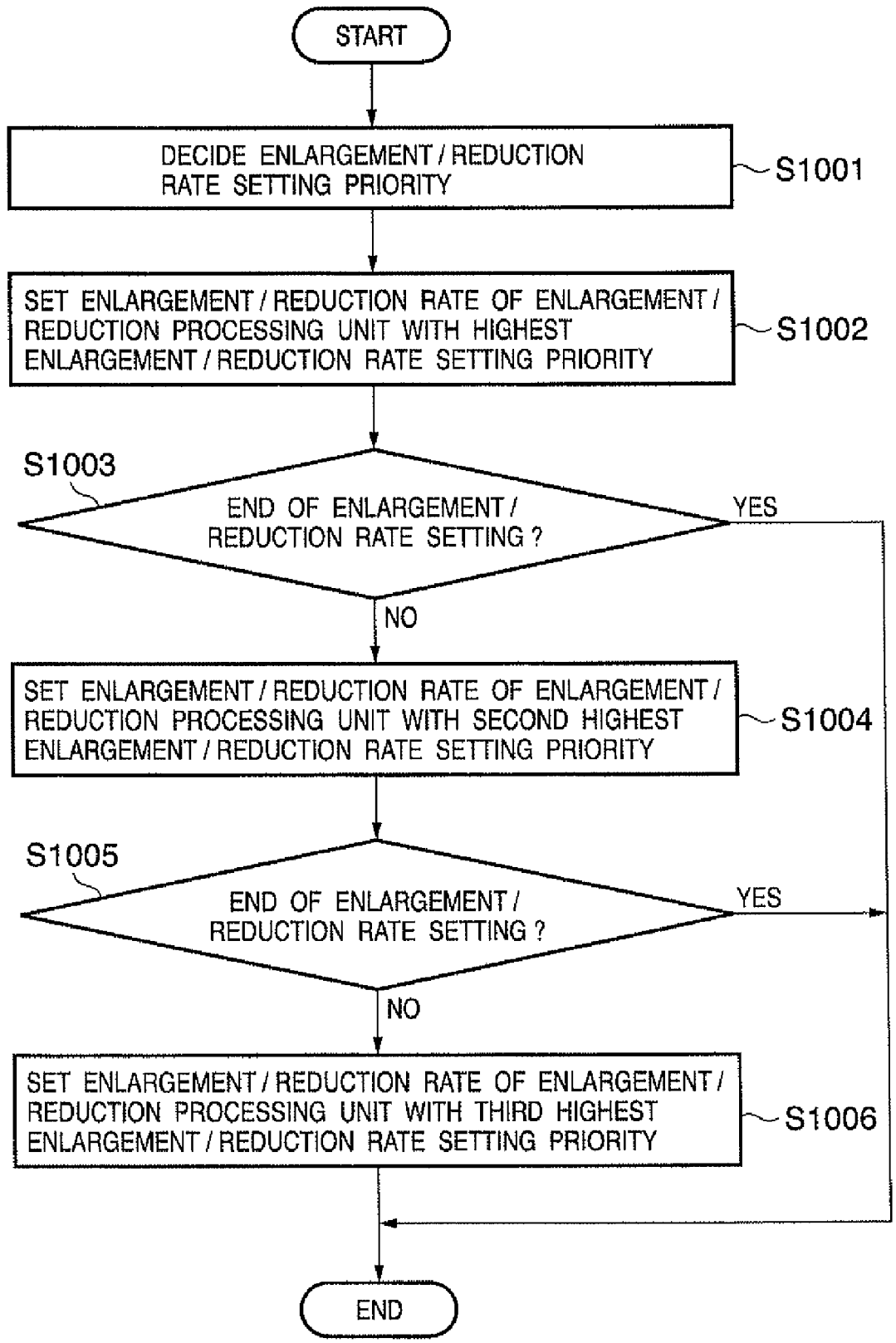
FIG. 6 is a flowchart showing details of enlargement/reduction rate distribution processing in step S104.

FIG. 6 is a flowchart showing details of enlargement/reduction rate distribution processing in step S104.

In step S1001, it is determined on the basis of a user input instruction which of the image quality-oriented mode and speed-oriented mode is to be used for copy. The enlargement/reduction rate setting priority of each enlargement/reduction processing unit corresponding to the mode is decided from the enlargement/reduction processing unit information database (DB) D106. The enlargement/reduction rate setting priority is an index representing which enlargement/reduction processing unit should preferentially receive enlargement/reduction rate distribution, i.e., which enlargement/reduction processing unit should preferentially be used, as described with reference to FIG. 5.

In step S1002, an enlargement/reduction rate not higher than the enlargement/reduction rate upper limit is set for the enlargement/reduction processing unit with the highest enlargement/reduction rate setting priority. The enlargement/reduction rate upper limit is shown in FIG. 5.

In step S1003, it is checked whether or not the enlargement/reduction processing unit with the highest enlargement/reduction rate setting priority can execute enlargement/reduction to the desired enlargement/reduction rate input by the user. If it is determined that enlargement/reduction to the desired enlargement/reduction rate is possible, the setting processing is ended. On the other hand, if it is determined that enlargement/reduction to the desired enlargement/reduction rate is not possible, the processing advances to step S1004 to set an enlargement/reduction rate not higher than the enlargement/reduction rate upper limit for the enlargement/reduction processing unit with the second highest enlargement/reduction rate setting priority.

In step S1005, it is checked whether or not the enlargement/reduction to the desired enlargement/reduction rate can be executed by using both the enlargement/reduction processing unit with the highest enlargement/reduction rate setting priority and the enlargement/reduction processing unit with the second highest enlargement/reduction rate setting priority. If it is determined that enlargement/reduction is possible, the setting processing is ended. If it is determined that enlargement/reduction to the desired enlargement/reduction rate is not possible even using the two enlargement/reduction processing units, the processing advances to step S1006.

In step S1006, an enlargement/reduction rate not higher than the enlargement/reduction rate upper limit is set for the enlargement/reduction processing unit with the third enlargement/reduction rate setting priority, and the processing is ended. Although not illustrated in FIG. 6, if the desired enlargement/reduction rate cannot be set even using the three enlargement/reduction processing units in step S1006, the user may be notified of the setting error by using the display unit 5. Alternatively, enlargement/reduction may be performed up to the enlargement/reduction rate possible by all enlargement/reduction processing units.

The copy operation is executed in accordance with the enlargement/reduction rate set in the above-described manner.

Figure 7:
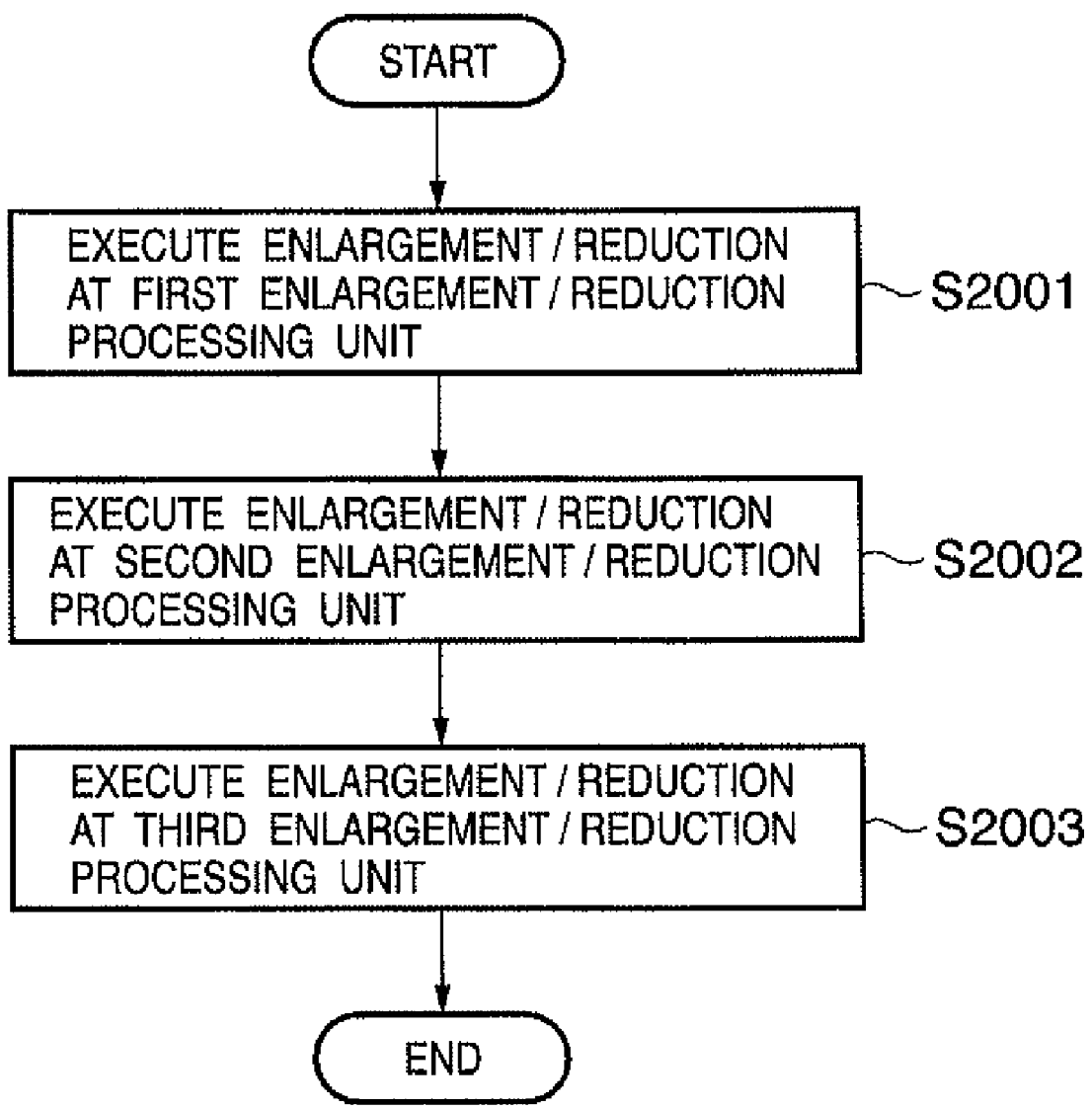
FIG. 7 is a flowchart showing enlargement/reduction processing according to the enlargement/reduction rate set in each enlargement/reduction processing unit.

FIG. 7 is a flowchart showing enlargement/reduction processing according to the enlargement/reduction rate set in each enlargement/reduction processing unit.

In step S2001, the first enlargement/reduction processing unit R08 executes enlargement/reduction processing in accordance with the enlargement/reduction rate set in step S104.

In step S2002, the second enlargement/reduction processing unit R10 executes enlargement/reduction processing in accordance with the enlargement/reduction rate set in step S104.

In step S2003, the third enlargement/reduction processing unit R12 executes enlargement/reduction processing in accordance with the enlargement/reduction rate set in step S104. Then, the processing is ended.

In the flowchart shown in FIG. 7, the enlargement/reduction processing units continuously execute processing. However, it goes without saying that image processing such as color space conversion and quantization is inserted between these enlargement/reduction processing operations.

Size-variable copy has been described above. When the read original image size is equal to the printing area size, i.e., same-size copy is executed, the enlargement/reduction rate set for all enlargement/reduction processing units by enlargement/reduction rate distribution processing in step S104 is 100%. Hence, in this embodiment, control is done to skip processing in all enlargement/reduction processing units.

Figure 8:
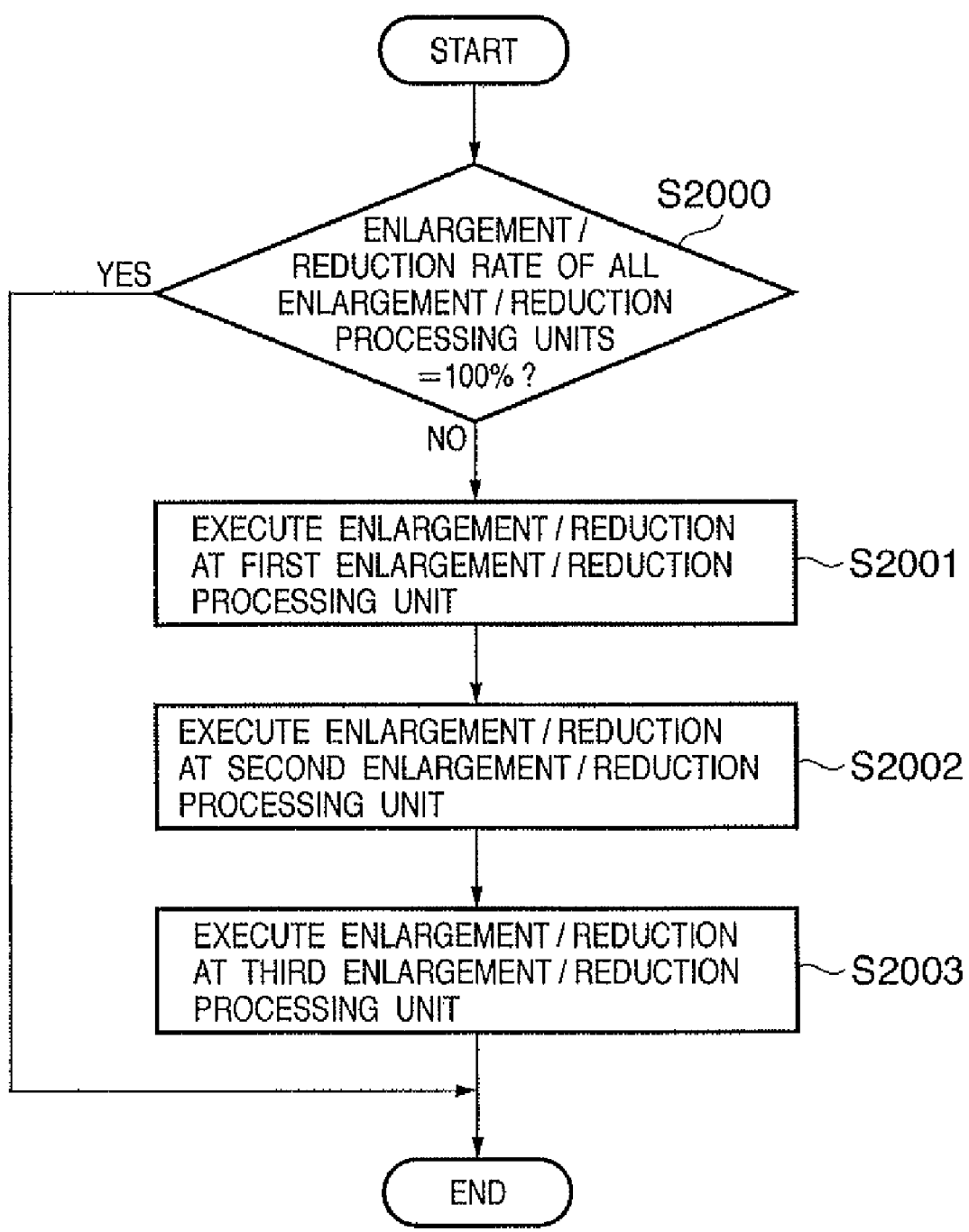
FIG. 8 is a flowchart showing enlargement/reduction processing skip processing executed in the same-size copy mode.

FIG. 8 is a flowchart showing enlargement/reduction processing skip processing executed in the same-size copy mode.

Processing in steps S2001 to s2003 in FIG. 8 is the same as that described in FIG. 7, and a description thereof will be omitted.

According to FIG. 8, in step S2000, it is checked whether or not the enlargement/reduction rate set in all enlargement/reduction processing units is 100% (same size). If it is determined that the enlargement/reduction rate set in all enlargement/reduction processing units is 100%, enlargement/reduction processing to be executed in each enlargement/reduction processing unit is skipped, and the processing is ended.

On the other hand, if it is determined in step S2000 that an enlargement/reduction rate other than 100% is set, the above-described processing in steps S2001 to S2003 is executed.

As described above, if processing in each enlargement/reduction processing unit is skipped in the same-size copy mode, the copy processing speed can be increased.

Specific examples of enlargement/reduction rate distribution processing for 400%/1,600% enlargement copy in the image quality-oriented mode and 400%/1,600% enlargement copy in the speed-oriented mode with information shown in FIG. 5 set in the enlargement/reduction processing unit information database (DB) D106 will be described below in detail.

(1) Image Quality-Oriented, Enlargement Rate: 400%

Figure 9:
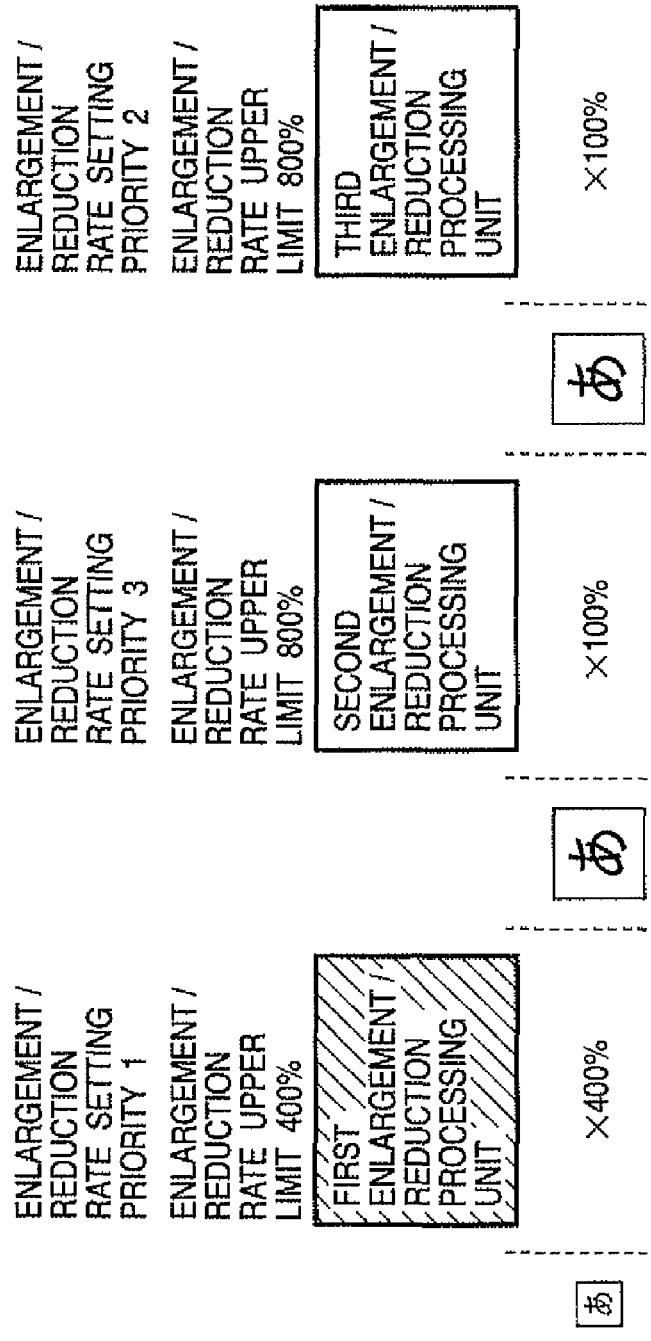
FIG. 9 is a view showing a state where 400% enlargement copy is executed in the image quality-oriented mode in accordance with an enlargement/reduction rate set in each enlargement/reduction processing unit.

FIG. 9 is a view showing a state where 400% enlargement copy is executed in the image quality-oriented mode in accordance with an enlargement/reduction rate set in each enlargement/reduction processing unit. Enlargement copy of a character image "あ" is illustrated.

As described above, the image area/size information deciding unit R02 decides the enlargement/reduction rate setting priority of each enlargement/reduction processing unit in the image quality-oriented mode from the enlargement/reduction processing unit information database D106. In the image quality-oriented mode, the enlargement/reduction rate setting priority of the first enlargement/reduction processing unit R08 is highest. For this reason, an enlargement/reduction rate not higher than the enlargement/reduction rate upper limit (400%) is set in the first enlargement/reduction processing unit R08. In this example, the desired enlargement/reduction rate is 400% which does not exceed the enlargement/reduction rate upper limit of the first enlargement/reduction processing unit R08. Hence, the enlargement/reduction rate of 400% is set in the first enlargement/reduction processing unit R08, and enlargement copy is executed. An enlargement/reduction rate of 100% (same size) is set in each of the second and third enlargement/reduction processing units.

(2) Image Quality-Oriented, Enlargement Rate: 1,600%

Figure 10:
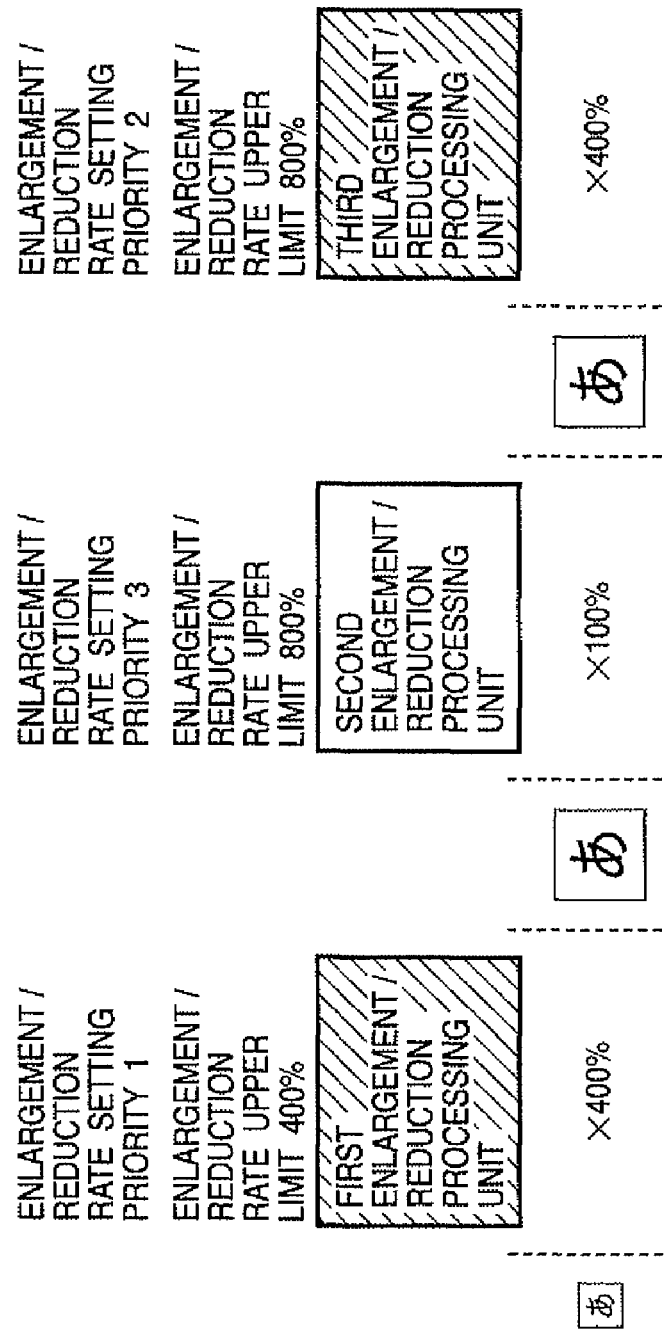
FIG. 10 is a view showing a state where 1,600% enlargement copy is executed in the image quality-oriented mode in accordance with an enlargement/reduction rate set in each enlargement/reduction processing unit.

FIG. 10 is a view showing a state where 1,600% enlargement copy is executed in the image quality-oriented mode in accordance with an enlargement/reduction rate set in each enlargement/reduction processing unit. Enlargement copy of a character image "あ" is illustrated.

As described above, the image area/size information deciding unit R02 decides the enlargement/reduction rate setting priority of each enlargement/reduction processing unit in the image quality-oriented mode from the enlargement/reduction processing unit information database D106. In the image quality-oriented mode, the enlargement/reduction rate setting priority of the first enlargement/reduction processing unit R08 is highest. For this reason, an enlargement/reduction rate not higher than the enlargement/reduction rate upper limit (400%) is set in the first enlargement/reduction processing unit R08. In this case, however, the desired enlargement/reduction rate is 1,600% which exceeds the enlargement/reduction rate upper limit of the first enlargement/reduction processing unit R08. Hence, the enlargement/reduction rate of 400% equal to the upper limit value is set in the first enlargement/reduction processing unit R08.

To achieve the enlargement rate of 1,600%, the image must further be enlarged at the enlargement rate of 400%. The image area/size information deciding unit R02 sets an enlargement/reduction rate not higher than the enlargement/reduction rate upper limit in the third enlargement/reduction processing unit R12 with the second highest enlargement/reduction rate setting priority. In this case, the enlargement/reduction rate necessary for achieving the target is 400%. Since this enlargement/reduction rate does not exceed the enlargement/reduction rate upper limit of the third enlargement/reduction processing unit R12, the enlargement/reduction rate of 400% is set in the third enlargement/reduction processing unit R12, and enlargement copy is executed. An enlargement/reduction rate of 100% (same size) is set in the second enlargement/reduction processing unit.

(3) Speed-Oriented, Enlargement Rate: 400%

Figure 11:
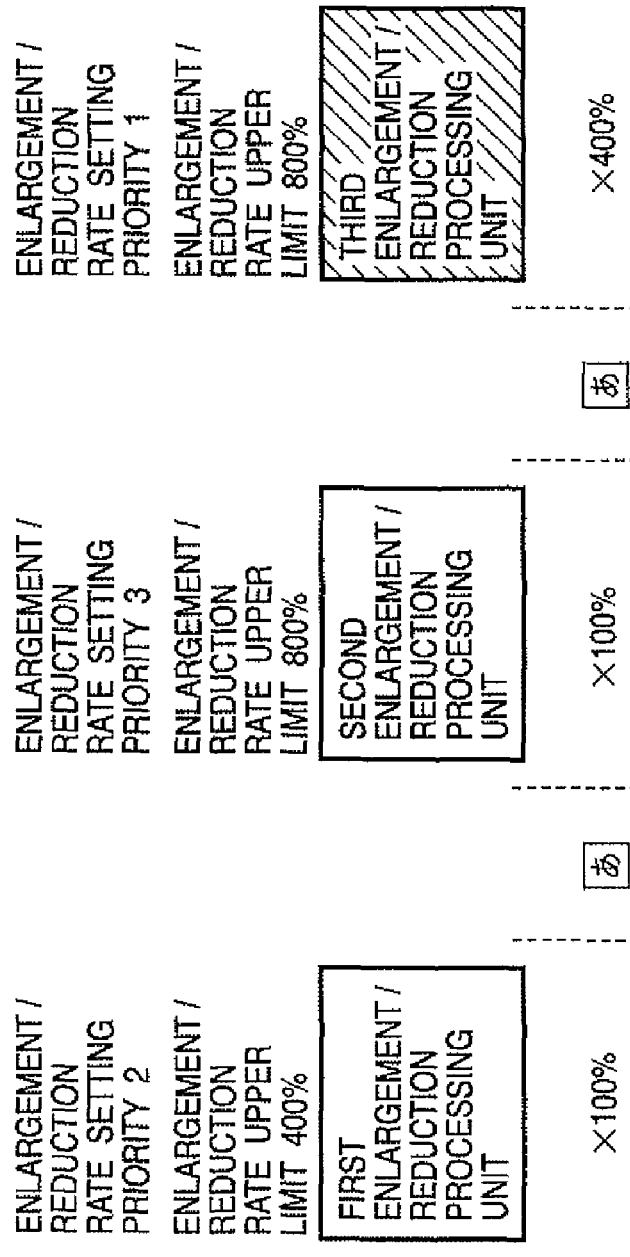
FIG. 11 is a view showing a state where 400% enlargement copy is executed in the speed-oriented mode in accordance with an enlargement/reduction rate set in each enlargement/reduction processing unit.

FIG. 11 is a view showing a state where 400% enlargement copy is executed in the speed-oriented mode in accordance with an enlargement/reduction rate set in each enlargement/reduction processing unit. Enlargement copy of a character image "あ" is illustrated.

As described above, the image area/size information deciding unit R02 decides the enlargement/reduction rate setting priority of each enlargement/reduction processing unit in the speed-oriented mode from the enlargement/reduction processing unit information database D106. In the speed-oriented mode, the enlargement/reduction rate setting priority of the third enlargement/reduction processing unit R12 is highest. For this reason, an enlargement/reduction rate not higher than the enlargement/reduction rate upper limit (800%) is set in the third enlargement/reduction processing unit R12. In this example, the desired enlargement/reduction rate is 400% which does not exceed the enlargement/reduction rate upper limit of the third enlargement/reduction processing unit R12. Hence, the enlargement/reduction rate of 400% is set in the third enlargement/reduction processing unit R12, and enlargement copy is executed. An enlargement/reduction rate of 100% (same size) is set in each of the first and second enlargement/reduction processing units.

(4) Speed-Oriented, Enlargement Rate: 1,600%

Figure 12:
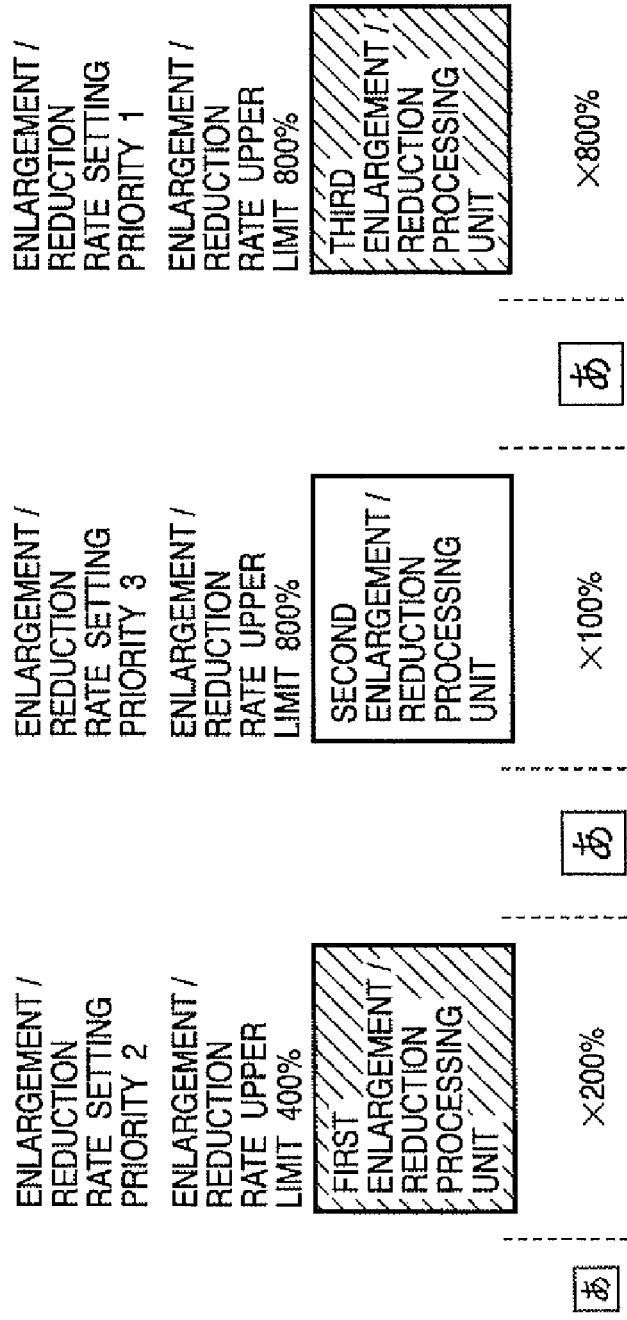
FIG. 12 is a view showing a state where 1,600% enlargement copy is executed in the speed-oriented mode in accordance with an enlargement/reduction rate set in each enlargement/reduction processing unit.

FIG. 12 is a view showing a state where 1,600% enlargement copy is executed in the speed-oriented mode in accordance with an enlargement/reduction rate set in each enlargement/reduction processing unit. Enlargement copy of a character image "あ" is illustrated.

As described above, the image area/size information deciding unit R02 decides the enlargement/reduction rate setting priority of each enlargement/reduction processing unit in the speed-oriented mode from the enlargement/reduction processing unit information database D106. In the speed-oriented mode, the enlargement/reduction rate setting priority of the third enlargement/reduction processing unit R12 is highest. For this reason, an enlargement/reduction rate not higher than the enlargement/reduction rate upper limit is set in the third enlargement/reduction processing unit R12. In this case, however, the desired enlargement/reduction rate is 1,600% which exceeds the enlargement/reduction rate upper limit of the third enlargement/reduction processing unit R12. Hence, the enlargement/reduction rate of 800% equal to the upper limit value is set in the third enlargement/reduction processing unit R12.

To achieve the enlargement rate of 1,600%, the image must further be enlarged at the enlargement rate of 200%. The image area/size information deciding unit R02 sets an enlargement/reduction rate not higher than the enlargement/reduction rate upper limit in the first enlargement/reduction processing unit R08 with the second highest enlargement/reduction rate setting priority. In this case, the enlargement/reduction rate necessary for achieving the target is 200%. Since this enlargement/reduction rate does not exceed the enlargement/reduction rate upper limit of the first enlargement/reduction processing unit R08, the enlargement/reduction rate of 200% is set in the first enlargement/reduction processing unit R08, and enlargement copy is executed. An enlargement/reduction rate of 100% (same size) is set in the second enlargement/reduction processing unit.

According to the above-described processing, when priority is given to the copy speed, enlargement/reduction processing with priority on the processing speed can be executed. When priority is given to the copy image quality, enlargement/reduction processing with priority on the image quality can be executed.

2. Enlargement/Reduction Rate Distribution Processing in Marginless Copy

Figure 13A:
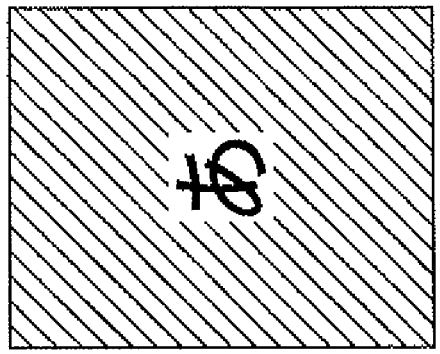
FIGS. 13A, 13B, and 13C are views for explaining marginless copy.
Figure 13B:
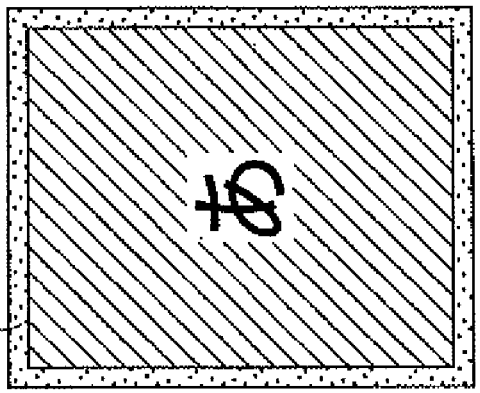
Figure 13C:
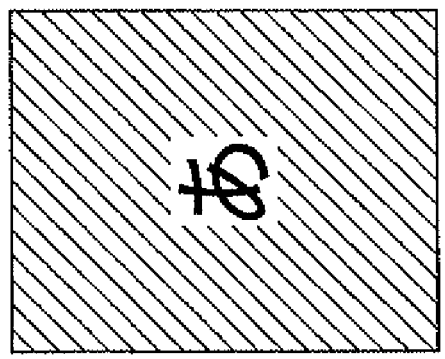

FIGS. 13A, 13B, and 13C are views for explaining marginless copy.

In marginless copy, an image is copied on a printing paper sheet without forming any margin. More specifically, this copy is implemented by enlarging a read original (FIG. 13A) to a size larger than the printing paper size and cutting off a fringe of the printing paper sheet, i.e., the area indicated by halftone dots in FIG. 13B in printing (FIG. 13C).

FIG. 14 is a table showing an example of enlargement/reduction processing unit information set in the enlargement/reduction processing unit information database D106.

Referring to FIG. 14, in margined copy in the image quality-oriented mode, the enlargement/reduction rate is distributed preferentially to the first enlargement/reduction processing unit R08, third enlargement/reduction processing unit R12, and second enlargement/reduction processing unit R10 in this order, and an enlargement/reduction processing unit with higher priority is preferentially used. In margined copy in the speed-oriented mode, the enlargement/reduction rate is distributed preferentially to the third enlargement/reduction processing unit R12, first enlargement/reduction processing unit R08, and second enlargement/reduction processing unit R10 in this order, and an enlargement/reduction processing unit with higher priority is preferentially used. In marginless copy, the enlargement/reduction rate is distributed preferentially to the third enlargement/reduction processing unit R12, first enlargement/reduction processing unit R08, and second enlargement/reduction processing unit R10 in this order, and an enlargement/reduction processing unit with higher priority is preferentially used.

In marginless copy, as described above, if the read original size is equal to the printing paper size, it is understood that the enlargement/reduction rate is low because the read original need to be enlarged to a size slightly larger than the printing paper size. Hence, even when the third enlargement/reduction processing unit R12 inferior to the first enlargement/reduction processing unit R08 in view of image quality executes enlargement/reduction processing, the difference (quality deterioration) in image quality is small if the enlargement/reduction rate is low. For this reason, in this embodiment, high-speed marginless copy is implemented by preferentially distributing the enlargement/reduction rate to the third enlargement/reduction processing unit R12 that is advantageous in terms of processing speed.

However, when the enlargement/reduction rate of the third enlargement/reduction processing unit R12 exceeds a certain threshold value, the difference in image quality becomes noticeable as compared to enlargement/reduction by the first enlargement/reduction processing unit R08. Hence, the enlargement/reduction rate upper limit of the third enlargement/reduction processing unit R12 is set to the threshold value. The set threshold value is equal to or smaller than the enlargement/reduction rate upper limit of the third enlargement/reduction processing unit R12 in margined copy. In this embodiment, 105% is set as the threshold value.

Specific examples of enlargement/reduction rate distribution processing for 105%/200% enlargement copy in the marginless copy mode will be described below in detail.

(1) Marginless Copy, Enlargement Rate: 105%

FIG. 15 is a view showing a state where 105% enlargement copy is executed in the marginless copy mode in accordance with an enlargement/reduction rate set in each enlargement/reduction processing unit. Enlargement copy of a character image "あ"is illustrated.

As described above, the image area/size information deciding unit R02 decides the enlargement/reduction rate setting priority of each enlargement/reduction processing unit in the marginless copy mode from the enlargement/reduction processing unit information database D106. In the marginless copy mode, the enlargement/reduction rate setting priority of the third enlargement/reduction processing unit R12 is highest. For this reason, an enlargement/reduction rate not higher than the enlargement/reduction rate upper limit (110%) is set in the third enlargement/reduction processing unit R12. In this case, the desired enlargement/reduction rate is 105% which does not exceed the enlargement/reduction rate upper limit of the third enlargement/reduction processing unit R12. Hence, the enlargement/reduction rate of 105% is set in the third enlargement/reduction processing unit R12, and enlargement copy is executed. An enlargement/reduction rate of 100% (same size) is set in each of the first and second enlargement/reduction processing units.

(2) Marginless Copy, Enlargement Rate: 200%

Figure 16:
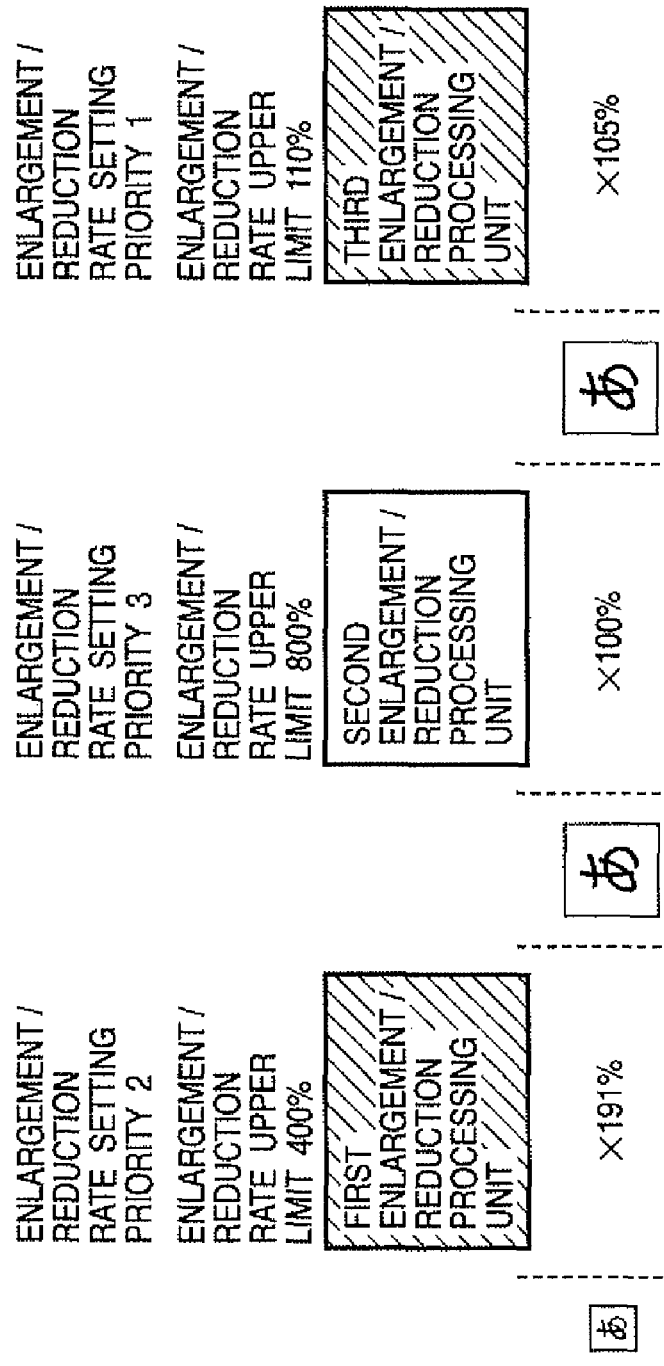
FIG. 16 is a view showing a state where 200% enlargement copy is executed in the marginless copy mode in accordance with an enlargement/reduction rate set in each enlargement/reduction processing unit.

FIG. 16 is a view showing a state where 200% enlargement copy is executed in the marginless copy mode in accordance with an enlargement/reduction rate set in each enlargement/reduction processing unit. Enlargement copy of a character image "あ"is illustrated.

As described above, the image area/size information deciding unit R02 decides the enlargement/reduction rate setting priority of each enlargement/reduction processing unit in the marginless copy mode from the enlargement/reduction processing unit information database D106. In the marginless copy mode, the enlargement/reduction rate setting priority of the third enlargement/reduction processing unit R12 is highest. For this reason, an enlargement/reduction rate not higher than the enlargement/reduction rate upper limit is set in the third enlargement/reduction processing unit R12. In this case, however, the desired enlargement/reduction rate is 200% which exceeds the enlargement/reduction rate upper limit of the third enlargement/reduction processing unit R12. Hence, the threshold enlargement/reduction rate of 105% is set in the third enlargement/reduction processing unit R12.

To achieve the enlargement rate of 200%, the image must further be enlarged at an enlargement rate of 191%. The image area/size information deciding unit R02 sets an enlargement/reduction rate not higher than the enlargement/reduction rate upper limit in the first enlargement/reduction processing unit R08 with the second highest enlargement/reduction rate setting priority. In this case, the enlargement/reduction rate necessary for achieving the target is 191%. Since this enlargement/reduction rate is not higher than the enlargement/reduction rate upper limit of the first enlargement/reduction processing unit R08, the enlargement/reduction rate of 191% is set in the first enlargement/reduction processing unit R08, and enlargement copy is executed. An enlargement/reduction rate of 100% (same size) is set in the second enlargement/reduction processing unit.

According to the above-described processing, in the marginless copy mode, enlargement/reduction processing is done by using an enlargement/reduction processing unit with a high processing speed to the extent that image degradation is not noticeable. Hence, marginless copy can be executed at a high speed.

According to the above-described embodiment, copy can be performed by executing appropriate enlargement/reduction processing in accordance with an instructed copy mode. In addition, since the enlargement/reduction rate not higher than the enlargement/reduction rate upper limit of each enlargement/reduction processing unit is set, processing can be prevented from becoming disabled due to an inappropriate enlargement/reduction rate set in each enlargement/reduction processing unit.

OTHER EMBODIMENT

Enlargement/reduction rate distribution processing in so-called memory copy will be described, in which after an image original is read, the image data is encoded and compressed, and the compressed data is temporarily stored in a memory and, in printing, read out from the memory and decoded and copied to a print medium. In this embodiment, JPEG is used to compress/decompress image data. However, compression/decompression can be done by an encoding method other than JPEG.

Figure 17:
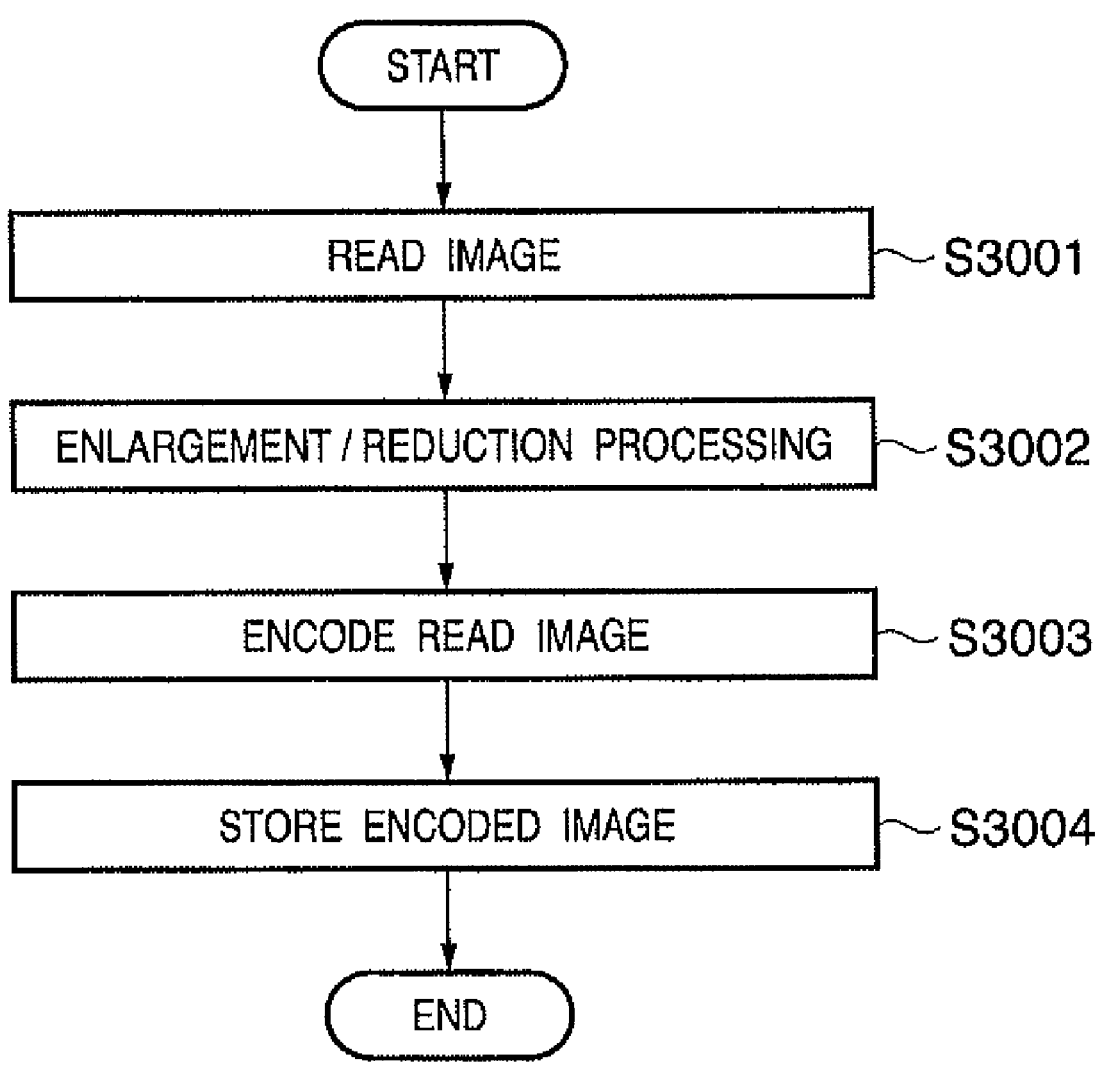
FIGS. 17 and 18 are flowcharts showing memory copy processing.
Figure 18:
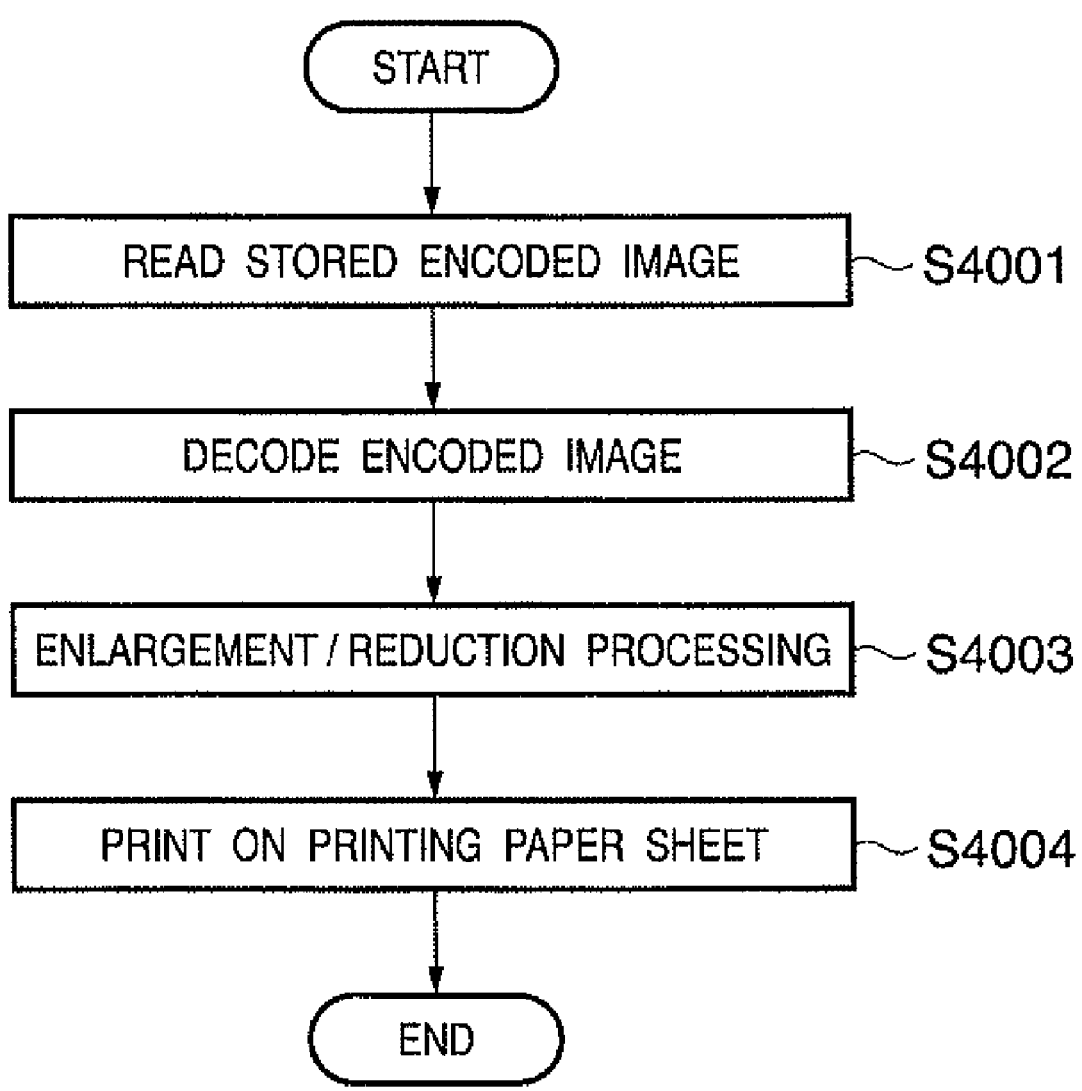

FIGS. 17 and 18 are flowcharts showing memory copy processing. FIG. 17 shows processing from image original reading to storage in a memory. FIG. 18 shows processing to read out from the memory to printing on a printing medium.

The processing shown in FIG. 17 will be described. This processing is executed by a read image processing unit R04. An image original is read, and image data generated by reading is encoded by JPEG, converted into a compressed image format, and stored in a memory.

More specifically, in step S3001, an image original is read. In step S3002, image data generated from the read image original is enlarged/reduced in accordance with a desired enlargement/reduction rate. In step S3003, the enlarged/reduced image data is encoded by JPEG and converted into data with a compression format. In step S3004, the compressed data is stored in a memory such as a RAM.

The processing shown in FIG. 18 will be described next. This processing is executed by a print image processing unit R05. Compressed image data from the memory is decoded, and an image is printed on a print medium.

More specifically, in step S4001, compressed data is read out from a memory such as a RAM. In step S4002, the compressed image data is decoded by JPEG. In step S4003, the decoded image data is enlarged/reduced at a desired enlargement/reduction rate. In step S4004, an image is printed on a print medium such as a printing paper sheet by using the enlarged/reduced image data.

FIG. 19 is a table showing an example of enlargement/reduction processing unit information set in an enlargement/reduction processing unit information database D106.

Referring to FIG. 19, an enlargement/reduction rate is distributed to a first enlargement/reduction processing unit R08, third enlargement/reduction processing unit R12, and second enlargement/reduction processing unit R10 preferentially in this order, regardless of whether the mode is normal copy or memory copy. An enlargement/reduction processing unit with a high priority is preferentially used.

As described above, in memory copy, since image data generated from a read image is temporarily encoded by JPEG, and the compressed image data is converted. Hence, the image quality may be poor because of encoding. To minimize degradation in image quality as much as possible, the image data need be enlarged/reduced at a desired enlargement/reduction rate before encoding.

In consideration of this, in this embodiment, an enlargement/reduction rate is distributed preferentially to the first enlargement/reduction processing unit R08. If an enlargement/reduction rate is distributed to the second enlargement/reduction processing unit R10 next, a copy result with small image degradation can be obtained. On the other hand, in memory copy, image data is stored on a memory, as described above. Hence, in an apparatus with limited memory resources, the stored data amount must be minimized.

To do this, in this embodiment, an enlargement/reduction rate is distributed to the third enlargement/reduction processing unit R12 up to a certain threshold value that makes degradation in image quality unnoticeable even when compressed or decompressed image data is subjected to enlargement/reduction processing. If the target enlargement/reduction rate is not obtained yet, the remaining enlargement/reduction rate is distributed to the second enlargement/reduction processing unit R10. With this processing, memory copy with small image degradation is implemented. The set threshold value is equal to or smaller than the enlargement/reduction rate upper limit of the third enlargement/reduction processing unit R12 in normal copy.

Specific examples of enlargement/reduction rate distribution processing for 400%/600% enlargement copy in the memory copy mode will be described below in detail.

(1) Memory Copy, Enlargement Rate: 400%

Figure 20:
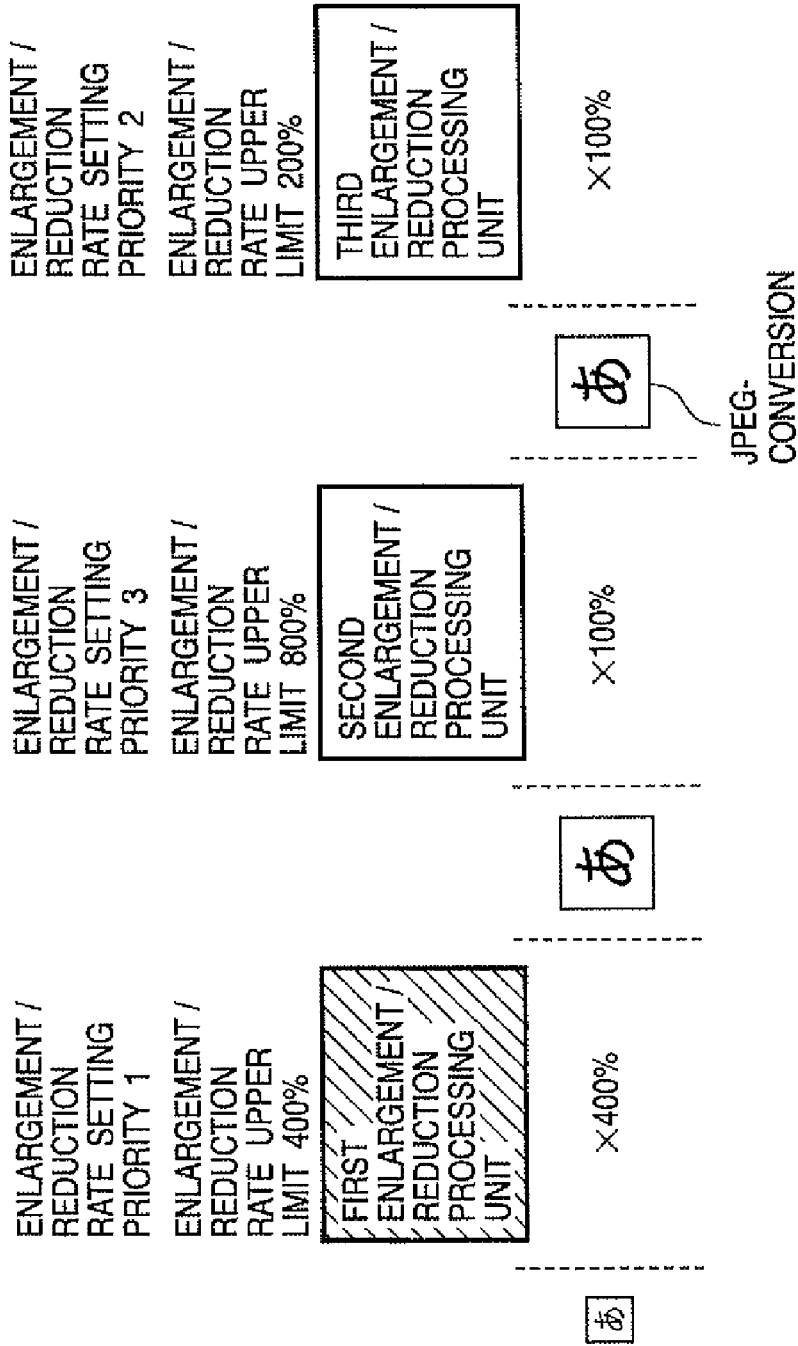
FIG. 20 is a view showing a state where 400% enlargement copy is executed in the memory copy mode in accordance with an enlargement/reduction rate set in each enlargement/reduction processing unit.

FIG. 20 is a view showing a state where 400% enlargement copy is executed in the memory copy mode in accordance with an enlargement/reduction rate set in each enlargement/reduction processing unit. Enlargement copy of a character image "あ"is illustrated.

As described above, an image area/size information deciding unit R02 decides the enlargement/reduction rate setting priority of each enlargement/reduction processing unit in the memory copy mode from the enlargement/reduction processing unit information database D106. In the memory copy mode, the enlargement/reduction rate setting priority of the first enlargement/reduction processing unit R08 is highest. For this reason, an enlargement/reduction rate not higher than the enlargement/reduction rate upper limit (400%) is set in the first enlargement/reduction processing unit R08. In this case, the desired enlargement/reduction rate is 400% which does not exceed the enlargement/reduction rate upper limit of the first enlargement/reduction processing unit R08. Hence, the enlargement/reduction rate of 400% is set in the first enlargement/reduction processing unit R08, and enlargement copy is executed. An enlargement/reduction rate of 100% (same size) is set in each of the second and third enlargement/reduction processing units.

(2) Memory Copy, Enlargement Rate: 600%

Figure 21:
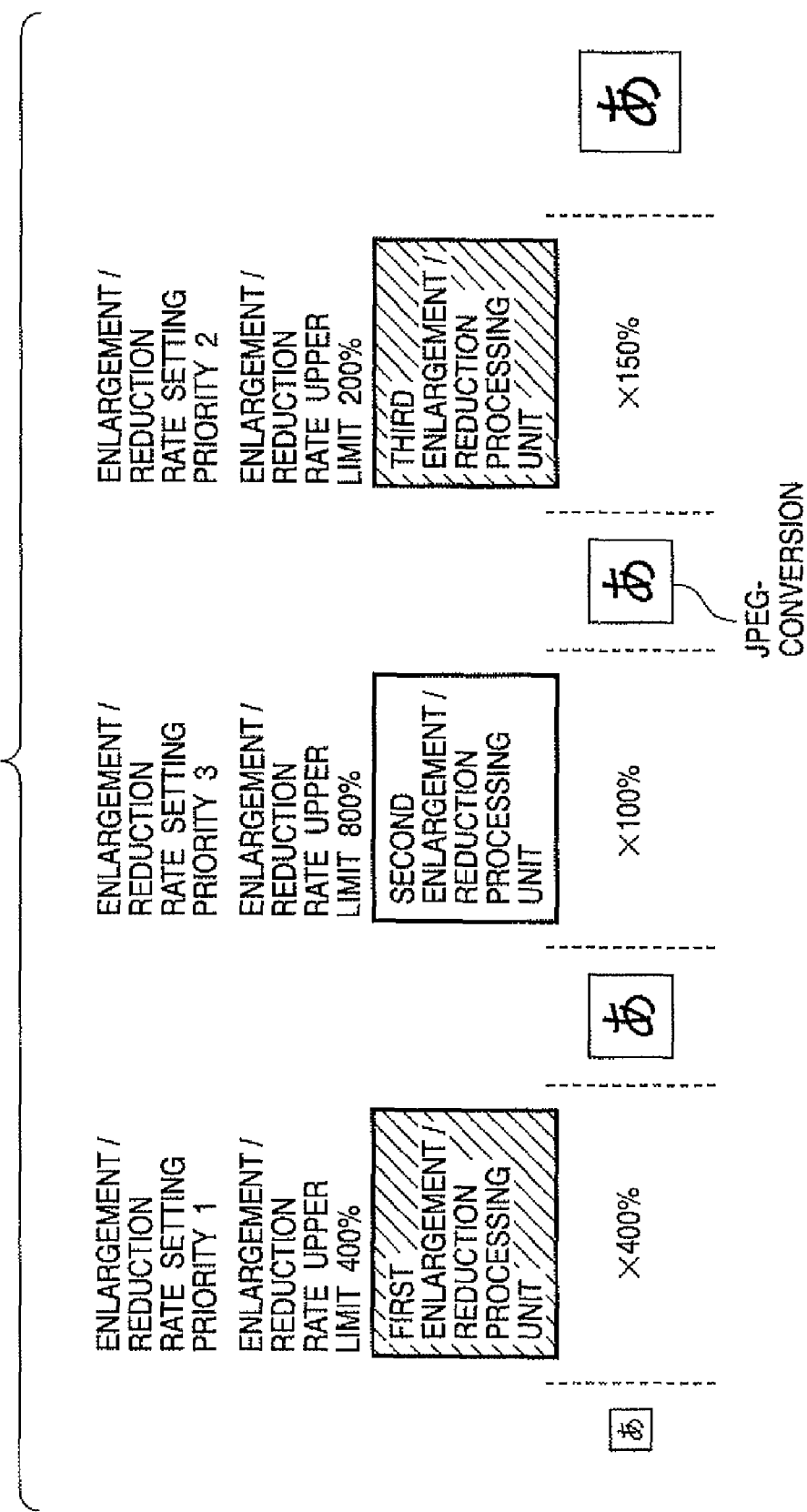
FIG. 21 is a view showing a state where 600% enlargement copy is executed in the memory copy mode in accordance with an enlargement/reduction rate set in each enlargement/reduction processing unit.

FIG. 21 is a view showing a state where 600% enlargement copy is executed in the memory copy mode in accordance with an enlargement/reduction rate set in each enlargement/reduction processing unit. Enlargement copy of a character image "あ"is illustrated.

As described above, the image area/size information deciding unit R02 decides the enlargement/reduction rate setting priority of each enlargement/reduction processing unit in the memory copy mode from the enlargement/reduction processing unit information database D106. In the memory copy mode, the enlargement/reduction rate setting priority of the first enlargement/reduction processing unit R08 is highest. For this reason, an enlargement/reduction rate not higher than the enlargement/reduction rate upper limit is set in the first enlargement/reduction processing unit R08. In this case, however, the desired enlargement/reduction rate is 600% which exceeds the enlargement/reduction rate upper limit of the first enlargement/reduction processing unit R08. Hence, the upper limit enlargement/reduction rate of 400% is set in the first enlargement/reduction processing unit R08.

To achieve the enlargement rate of 600%, the image must further be enlarged at an enlargement rate of 150%. The image area/size information deciding unit R02 sets an enlargement/reduction rate not higher than the enlargement/reduction rate upper limit in the third enlargement/reduction processing unit R12 with the second highest enlargement/reduction rate setting priority. In this case, the enlargement/reduction rate necessary for achieving the target is 150%. Since this enlargement/reduction rate does not exceed the enlargement/reduction rate upper limit of the third enlargement/reduction processing unit R12, the enlargement/reduction rate of 150% is set in the third enlargement/reduction processing unit R12, and enlargement copy is executed. An enlargement/reduction rate of 100% (same size) is set in the second enlargement/reduction processing unit.

According to the above-described processing, in the memory copy mode, enlargement/reduction processing is done before image data compression as much as possible. Hence, memory copy with small image degradation can be performed. In addition, since enlargement/reduction processing is executed to make the compressed data size small, the storable compressed image data amount can be increased. This indicates that the number of readable original pages by memory copy increases.

Even in this embodiment, since the enlargement/reduction rate not higher than the enlargement/reduction rate upper limit of each enlargement/reduction processing unit is set, processing can be prevented from becoming disabled due to an inappropriate enlargement/reduction rate set in each enlargement/reduction processing unit.

It should be noted that, although this invention has been illustrated using a multifunction printer having a copy function, this invention is applicable to a digital still camera and a digital video camcorder. In this case, the first enlargement/reduction processing unit is realized as an optical enlargement/reduction unit. In other words, a zoom lens in the digital still camera and digital video camcorder can play the role of the above first enlargement/reduction processing unit, and a digital processing unit in the digital still camera and digital video camcorder corresponds to the above second and third enlargement/reduction processing units.

Conventionally, the digital still camera and digital video camcorder have only an image quality-oriented mode. Upon enlarging an image in this case, the image is optically enlarged to a maximum enlargement rate, and then the optically enlarged image is further digitally enlarged to a desired rate. According to this invention, a speed-oriented mode is provided. Thus, in a case where it is detected that a user suddenly zooms up the optical lens beyond the adjustment capability, an operation mode may be switched over from the image quality-oriented mode to the speed-oriented mode so that the digital enlargement/reduction can cope with such a sudden change. When the user stops changing the enlargement, the mode may be switched back from the speed-oriented mode to the image quality-oriented mode, and then the digital still camera and digital video camcorder memorizes the changed enlargement rate. If the changed enlargement rate is within an available rate of the optical zoom lens, control is made such that the enlargement is performed only by the optical zoom lens. On the other hand, if the changed enlargement rate is beyond the available rate of the optical zoom lens, control is made such that the enlargement is first performed by the optical zoom lens to its maximum enlargement rate, and is further digitally enlarged by the digital processing unit to a desired enlargement rate. In this case, the digital processing unit enlarges the image at a rate obtained from the difference between the desired enlargement rate and the maximum enlargement rate of the optical zoom lens.

This makes it possible for a digital still camera and digital video camcorder to perform fast enlargement/reduction beyond the capability of the optical zoom lens.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2005-232301, filed on Aug. 10, 2005, which is hereby incorporated by reference herein in its entirety.

What is claimed is:

1. An image processing apparatus for performing a copy operation for causing a reader to read an image on an original and a printer to print the image read by the reader on a print medium, comprising:

a plurality of scaling units configured to scale the image read by the reader, wherein the plurality of scaling units include a first scaling unit with high image quality performance and a second scaling unit with high processing speed performance;

an input unit configured to input an instruction for selecting one of a plurality of copy modes for performing the copy operation including a marginless copy mode for performing the copy operation without margin on the print medium;

a setting unit configured to set a scaling ratio for scaling the image read by the reader;

a decision unit configured to decide a utilization ratio of each of the plurality of scaling units in accordance with the copy mode selected by the instruction inputted by the input unit and the scaling ratio set by the setting unit; and a copy control unit configured to perform the copy operation by causing at least one of the plurality of scaling units to scale the image read by the reader in accordance with the utilization ratio decided by the decision unit and causing the printer to print the image scaled by the at least one of the plurality of scaling units on the print medium, wherein, in a case where the input unit inputs an instruction for selecting the marginless copy mode, the decision unit decides the utilization ratio so as to preferentially use the second scaling unit, and in a case where the input unit inputs an instruction for selecting a copy mode for an image-quality oriented copy operation other than the marginless copy mode of the plurality of copy modes and the setting unit sets a scaling ratio other than 100%, the decision unit decides the utilization ratio so as to preferentially use the first scaling unit.

2. The apparatus according to claim 1, wherein the reader reads the image by scanning the original, and the first scaling unit scales the image by controlling the scanning by the reader.

3. The apparatus according to claim 1, wherein the second scaling unit scales the image read by the reader by processing image data based on the image read by the reader.

4. The apparatus according to claim 1, wherein, in a case where the input unit inputs an instruction for selecting a speed-oriented copy mode for performing the copy operation with margins on the print medium and the setting unit sets a scaling ratio other than 100% for the speed-oriented copy mode, the decision unit decides the utilization ratio so as to preferentially use the second scaling unit.

5. A method of controlling an image processing apparatus for performing a copy operation for causing a reader to read an image on an original and a printer to print the image read by the reader on a print medium, the apparatus including a plurality of scaling units configured to scale the image read by the reader, wherein the plurality of scaling units include a first scaling unit with high image quality performance and a second scaling unit with high processing speed performance, the method comprising:

inputting an instruction for selecting one of a plurality of copy modes for performing the copy operation including a marginless copy mode for performing the copy operation without margin on the print medium;

setting a scaling ratio for scaling the image read by the reader;

deciding a utilization ratio of each of the plurality of scaling units in accordance with the copy mode selected by the inputted instruction and the set scaling ratio; and performing the copy operation by causing at least one of the plurality of scaling units to scale the image read by the reader in accordance with the decided utilization ratio and causing the printer to print the image scaled by the at least one of the plurality of scaling units on the print medium, wherein, in a case where an instruction for selecting the marginless copy mode is inputted, the utilization ratio is decided so as to preferentially use the second scaling unit, and in a case where an instruction for selecting a copy mode for an image-quality oriented copy operation other than the marginless copy mode of the plurality of copy modes is inputted and a scaling ratio other than 100% is set, the utilization ratio is decided so as to preferentially use the first scaling unit.

6. A non-transitory computer readable medium containing a program which executes each step recited in claim 5 by a computer.

* * * * *